United States Patent
NewDelman et al.

(10) Patent No.: US 12,471,511 B2
(45) Date of Patent: Nov. 18, 2025

(54) APERTURE ASSEMBLY FOR USE WITH A SUBSURFACE EJECTION VESSEL

(71) Applicant: SUB-MERGENT TECHNOLOGIES, INC., Lake Oswego, OR (US)

(72) Inventors: Mitchell J. NewDelman, Monte Carlo (MC); John A. Sanders, Austin, TX (US)

(73) Assignee: SUB-MERGENT TECHNOLOGIES, INC., Southlake, TX (US)

( * ) Notice: Subject to any disclaimer, the term of this patent is extended or adjusted under 35 U.S.C. 154(b) by 693 days.

(21) Appl. No.: 17/876,577

(22) Filed: Jul. 29, 2022

(65) Prior Publication Data

US 2024/0032449 A1    Feb. 1, 2024

(51) Int. Cl.
*A01B 49/06*    (2006.01)
*A01C 23/02*    (2006.01)
*A01M 17/00*    (2006.01)

(52) U.S. Cl.
CPC .......... *A01B 49/065* (2013.01); *A01C 23/026* (2013.01); *A01M 17/002* (2013.01)

(58) Field of Classification Search
CPC ....... A01B 49/065; A01B 49/06; A01B 49/04; A01B 49/00; A01C 23/026; A01C 23/023; A01C 23/02; A01C 23/00; A01M 17/002; A01M 17/00
See application file for complete search history.

(56) References Cited

FOREIGN PATENT DOCUMENTS

| CN | 206772619 U | * 12/2017 | |
| CN | 110159250 A | * 8/2019 | ............... E02D 1/00 |
| CN | 114946621 A | * 8/2022 | |

* cited by examiner

Primary Examiner — Christopher J. Novosad
(74) Attorney, Agent, or Firm — Bailey Legal Services, PLLC

(57) ABSTRACT

An aperture assembly for use with a subsurface ejection vessel includes an electromagnet, a first dynamic aperture, a second dynamic aperture, a hollow shaft injection drill bit, a third dynamic aperture, collar perforations, and closed window apertures. The electromagnet actuates a closing of the first dynamic aperture. The electromagnet actuates an opening of the second dynamic aperture. The third dynamic aperture dynamically opens when triggered by a first pre-determined depth achievement counting by the encoder of the lead screw or distance traveled by a platform (505A) triggered by the limit switch that are communicated to the AI robot, the computer, and the PLC. The third dynamic aperture dynamically opens when the camera lens has a second pre-determined depth penetration of the hollow shaft injection drill bit and that the limit switch information is communicated to the computer, or the PLC.

25 Claims, 19 Drawing Sheets

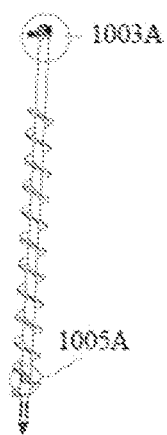
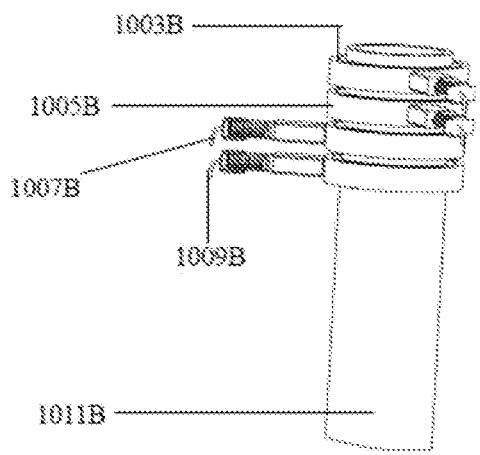
Figure 10A          Figure 10B
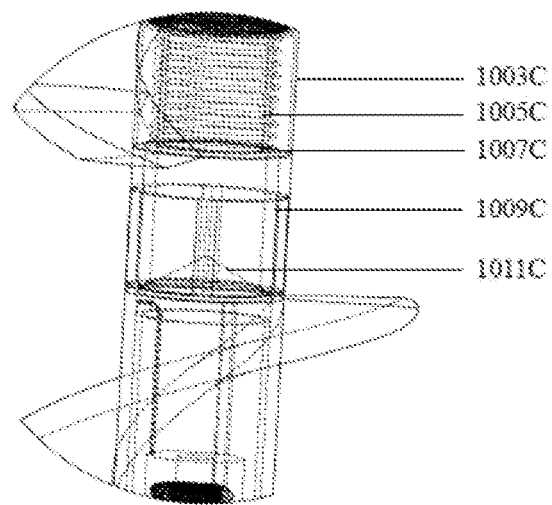
Figure 10C

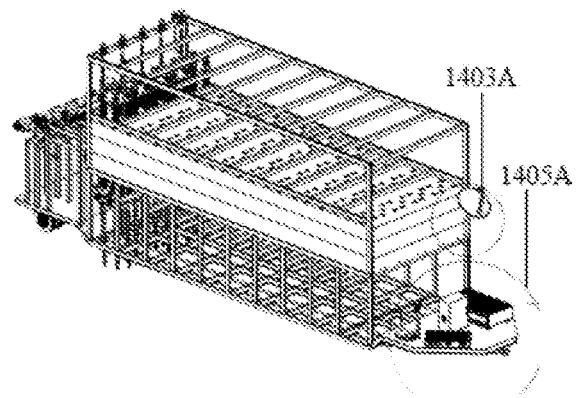 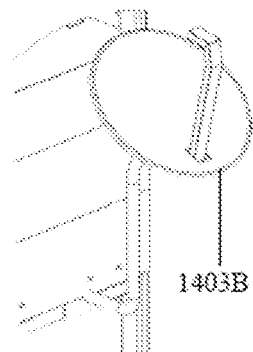
Figure 14A  Figure 14B
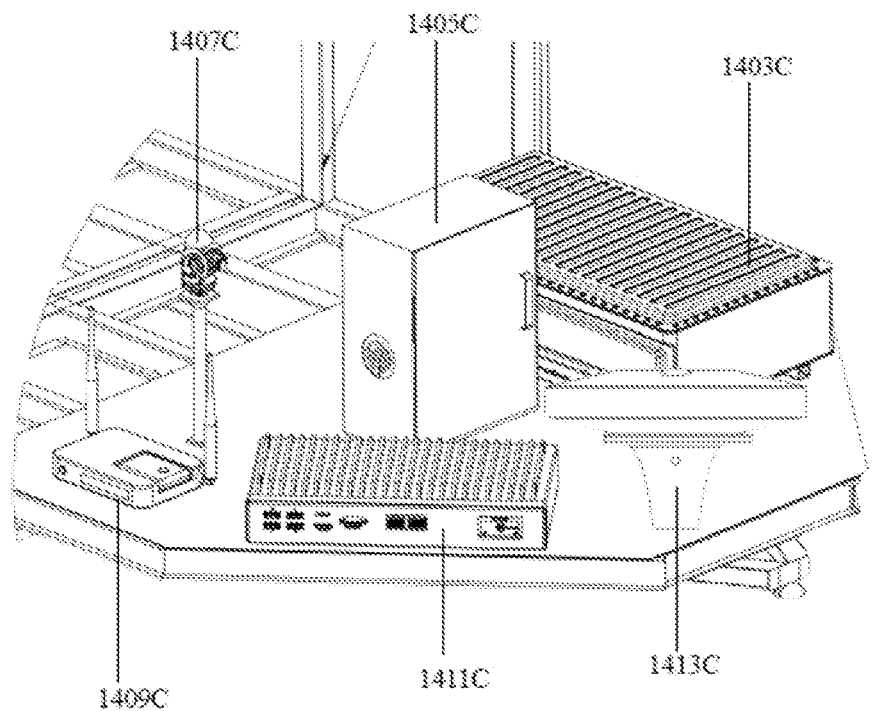
Figure 14C

APERTURE ASSEMBLY FOR USE WITH A SUBSURFACE EJECTION VESSEL

TECHNICAL FIELD

The present invention is generally related to an aperture assembly for use with a subsurface ejection vessel. More particularly, the present disclosure relates to an aperture assembly for a subsurface ejection vessel such as a tube or hollow shaft drilling device supported in a cylindrical or polygonal shape which sealing segment may include in one embodiment a surface seal of a tube or hollow drilling mechanism, to facilitate constituent material ejection from the tube or hollow shaft drilling mechanism and subsequent sub-surface injection.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

With an expected world population of 9 billion by 2050, the need to produce more food and fiber is urgent. Irrigated agriculture is more productive, yet large amounts of water are required to maintain maximum yields. Agricultural science strives to improve irrigation management to minimize water inputs while optimizing crop productivity.

Innovative irrigation management could help avoid negative environmental and economic consequences of over-or under-irrigation. Under irrigation affects crop quality and yield. Over-irrigation increases topsoil erosion and the potential of property contamination due to chemical flows. Water resource depletion could consequently increase a region's susceptibility to drought. Non-optimal irrigation can provoke losses to growers, to the local community, and hence, food security.

Optimally efficient irrigation is a function of soil water status across the root zone. Prescribed soil amendment materials, either organic/in-organic and/or non-organic matter, can be injected either for soil health or for water retention.

This specification recognizes that there is a need for an efficient apparatus that can inject down to various targeted root zone sections and/or at sub-rootzone soil horizons for soil health and hence enhanced yield and/or for water retention modification for drought resilience.

Soil amendments applying biochar of many varieties have been examined for crop yield and quality as well as for regulating nitrogen level imbalances due to increased fertilizer use, for pesticide dosage, et cetera.

It is known that locally produced biochar can improve the physical condition of light-textured soils important for crop growth through increased soil aggregate stability, porosity, and available water contents where it reduced soil bulk density. Reduced bulk density due to soil aggregation may aid root growth with more water available. Biochar application to highly weathered and sandy soils will, therefore, increase the soils' resilience against drought.

There is an ever-increasing array of discrete amendments being tried to enhance soil health and/or productivity at the surface or near-surface soil horizons, as well as some rudimentary soil health amendment spiking of soils. When referencing biochar or other soil amendment application rates, the literature discusses topsoil spreading and sometimes mechanical blending down as far as 30 centimeters with surface disruption; but there are no references exist in the art to provide multiple targeted releases through injection at and below the root zone with minimal surface disruption.

European patent application EP1203522A1 filed by Hargreaves Jonathan William et al. discloses Ground injection, e.g., aeration, apparatus adapted to be mounted on or drawn by a tractor and comprising one or more tines reciprocated vertically by a crank and crankshaft-driven from a motor. Each tine defines an internal passage with outlet apertures. A piston rod connected to each tine and a cylinder has a piston that forces air into a reservoir and via a line into the passage. The mechanism is timed such that a pulse of air is injected into the ground through outlet apertures at the position of maximum penetration of the ground by each tine. Instead of air, a liquid or other gaseous substance may be injected into the ground where it is penetrated by each tine. The apparatus may include two or more rows of such tines and associated injection means.

A PCT application WO 2020/020890 A1 filed by Reid Brian J et al. discloses a solid dosage form comprising biochar and at least one pesticide and/or at least one antimicrobial, wherein said biochar and said at least one pesticide and/or said at least one antimicrobial is homogeneously mixed in said dosage form and said dosage form does not have a layered structure. The invention also provides a method for preparing the dosage form, a liquid composition comprising the dosage form, and a method of controlling pests using the dosage form.

However, none of these prior arts talk about targeted injection(s) at or below the horizon A and or below 30 cm from the surface.

The present specification further recognizes that there is a need for blending soil amendment materials below the root zone and/or at desired targeted zones along the sub-surface root zone that does not currently exist. There is a further need for an efficient and cost-effective aperture assembly for use with a subsurface ejection vessel.

Thus, in view of the above, there is a long-felt need in the industry to address the aforementioned deficiencies and inadequacies.

Further limitations and disadvantages of conventional and traditional approaches will become apparent to one having skill in the art through comparison of described systems with some aspects of the present disclosure, as set forth in the remainder of the present application and with reference to the drawings.

SUMMARY OF THE INVENTION

An aperture assembly for use with a subsurface ejection vessel is provided substantially, as shown in and/or described in connection with at least one of the figures, as set forth more completely in the claims.

An aspect of the present disclosure relates to an aperture assembly for use with a subsurface ejection vessel that includes an electromagnet, a first dynamic aperture, a second dynamic aperture, an encoder, a lead screw, a plurality of limit switches, an artificial intelligence (AI) robot, a computer, a programmable logic controller (PLC), a camera lens, a hollow shaft injection drill bit, a third dynamic aperture, a plurality of collar perforations, and a plurality of closed window apertures. The electromagnet actuates a closing of the first dynamic aperture. The electromagnet actuates an opening of the second dynamic aperture. The third dynamic aperture dynamically opens when triggered by a first pre-determined depth achievement counting by the encoder of the lead screw or distance traveled by a platform triggered by the limit switch that is communicated to the AI robot, the computer, and the PLC. The third dynamic aperture dynamically opens when the camera lens has a second pre-determined depth penetration of the hollow shaft injection drill bit and that the limit switch information is communicated to the computer, or the PLC. The collar perforations enable pushing a plurality of sub-surface constituents and soils away from one or more of a plurality of collar apertures, and a plurality of collar windows. The closed window apertures perform closure during descent to prevent soil penetration into the hollow shaft injection drill bit. The closed window apertures during descent to prevent soil penetration into the hollow shaft injection drill bit.

In an aspect, the aperture assembly includes an aperture to perform closure during descent to prevent soil penetration into the hollow shaft injection drill bit.

In an aspect, the aperture assembly includes an electromagnetic spring aperture to perform closure during descent because of an inverted matching of an apex of a cone-shaped spillway to the electromagnetic spring aperture to prevent soil penetration into the hollow shaft injection drill bit.

In an aspect, the electromagnetic spring aperture opens during ascent because of the inverted matching of the apex of the cone-shaped spillway to the electromagnetic spring aperture to prevent soil penetration into the hollow shaft injection drill bit.

In an aspect, the third dynamic aperture closes dynamically when the camera lens and a gimbal have a pre-determined depth descent penetration of the hollow shaft injection drill bit, and that information is communicated to the PLC, the AI robot, the gimbal, and the computer.

In an aspect, the third dynamic aperture opens dynamically when a pre-set of the plurality of the limit switches has been triggered by the platform traveling to a pre-determined depth penetration of the hollow shaft injection drill bit, and that information is communicated to the PLC, the AI robot, the gimbal, and the computer.

In an aspect, the third dynamic aperture closes when the pre-set of the plurality of the limit switches has been triggered by an injection drill bit array descent traveling to a determined depth penetration of the hollow shaft injection drill bit, and that information is communicated to the PLC, the AI robot, the gimbal, and the computer.

In an aspect, the third dynamic aperture performs communication that enables multiple injection openings and closings by descending then ascending, and then re-descending with a subsequent ascent.

In an aspect, the third dynamic aperture performs communication that enables multiple injection durations in concert with a load cell dispensing.

In an aspect, the third dynamic aperture performs depth and volume communication that enables specific constituent injection duration in concert with the load cell dispensing.

In an aspect, the third dynamic aperture and the encoder perform timed revolutions communication with the PLC, the AI robot, the gimbal, and the computer that enable multiple injection durations in concert with soil and or subsoil porosity enabled by slowed encoder revolutions of a lead screw progress.

In an aspect, the third dynamic aperture performs communication that enables specific constituent injection durations in concert with specific X, Y location of a Global Positioning System (GPS) of core sample soil and/or amendment needs to be obtained from a subsoil database.

In an aspect, the collar perforations protect the apertures from soil penetration.

In an aspect, the collar perforations strengthen an ejection assembly through shapes like honeycombs or uniform windows.

In an aspect, the collar perforations in shapes or patterns enable structural integrity and whose burrs and or beveled edges push away soils from the aperture.

In an aspect, the third dynamic aperture enables the opening and closing of the aperture to enable multiple sub-surface injections within the same strata and or horizon.

In an aspect, the third dynamic aperture enables the constituent loading by sequence and volume for subsequent injection.

In an aspect, the third dynamic aperture enables the ejection from a tube within and/or hollow shaft injection drill bit at specific depths and location of the GPS.

In an aspect, the third dynamic aperture enables the ejection from a tube within and/or hollow shaft injection drill bit at specific time intervals.

In an aspect, the third dynamic aperture enables multiple loads and reloads of the constituents to create larger volume horizons of constituents at specific depths.

In an aspect, the third dynamic aperture enables actuation based on proximity to root systems that happen in concert with Lidar mapping or known root depth of specific plants or trees.

In an aspect, the third dynamic aperture enables the injection of a single constituent or multiple constituents either separated by volume and strata for placement in multiple states either colloid, dry, damp, or mixed as a slurry or liquid.

In an aspect, the third dynamic aperture enables the injection of a gas, vapor, and/or fogs by volume at specific depths for placement.

In an aspect, the third dynamic aperture enables the ejection of a plurality of living organisms comprising earthworms and/or any eggs, larva from the hollow shaft injection drill bit, or tube of the hollow shaft injection drill bit or ejected the tube into the sub-surface soil.

In an aspect, the third dynamic aperture enables the constituents of living organisms injection, wherein the constituents of living organisms comprising aneic earthworms improve porosity by penetrating subsoil below a root zone.

According to an embodiment herein, the present invention provides a spring or window assembly for subsurface ejection from a vessel, a tube, or a hollow drilling device supported in a cylindrical or polygonal shape in which a sealing segment can be actuated.

In one embodiment use of an electromagnetic spring for a subsurface ejection vessel by way of example but not limited to a tube or hollow drilling device supported in a cylindrical or polygonal shape which sealing segment may include in one embodiment a surface seal of a tube or hollow drilling mechanism, to facilitate constituent material ejection from the tube or hollow drilling mechanism and subsequent sub-surface injection.

The actuated spring or window assembly may be vertical or horizontal.

Any actuation device including an electromagnetic spring can be triggered by a Lidar index map result, depth sensor, the timing interval of the drilling process, or artificial intelligence eye through coordination with the computer or Programmable Logic Controller. Actuation can be triggered multiple times and reset within the same hole.

Accordingly, one advantage of the present invention is that it provides an injection within a four-inch diameter hollow shaft and subsequent deployment of wings with a length of eight inches can blend material within a twenty-inch circumferential sub-surface soil horizon.

Accordingly, one advantage of the present invention is that it facilitates access to sub-root zone horizons as potential massive carbon sinks for certifiable carbon sequestration.

Accordingly, one advantage of the present invention is that it provides partially deployable wings at angles less than 90 degrees to blend material within a smaller circumferential sub-surface soil horizon.

Accordingly, one advantage of the present invention is that it provides wings with blades that can be embedded such as but not by way of limitation industrial diamonds, to cut through sub-surface impediments such as live roots, dead roots, and rocks.

Accordingly, one advantage of the present invention is that it provides a value of changing the densities of soil to positively affect the yield. By adding a material that has substantially less bulk density a change in the porosity and the soil gravimetric profile occurs.

These features and advantages of the present disclosure may be appreciated by reviewing the following description of the present disclosure, along with the accompanying figures wherein like reference numerals refer to like parts.

BRIEF DESCRIPTION OF DRAWINGS

The accompanying drawings illustrate the embodiments of systems, methods, and other aspects of the disclosure. Any person with ordinary skills in the art will appreciate that the illustrated element boundaries (e.g., boxes, groups of boxes, or other shapes) in the figures represent an example of the boundaries. In some examples, one element may be designed as multiple elements, or multiple elements may be designed as one element. In some examples, an element shown as an internal component of one element may be implemented as an external component in another and vice versa. Furthermore, the elements may not be drawn to scale.

Various embodiments will hereinafter be described in accordance with the appended drawings, which are provided to illustrate, not limit, the scope, wherein similar designations denote similar elements, and in which:

FIG. 10A illustrates a view of an exemplary call-out of a hollow shaft drilling auger as seen in FIG. 10C, in accordance with at least one embodiment.

FIG. 10B illustrates a view of an exemplary view of wires, insulation, carbon brush, and other electromagnet components, in accordance with at least one embodiment.

FIG. 10C illustrates a transparent view of an exemplary bottom section of an electromagnet that controls an aperture, in accordance with at least one embodiment.

FIG. 14A illustrates a view of an exemplary communications platform of an injection drilling trailer with components seen in FIG. 14B and FIG. 14C, in accordance with at least one embodiment.

FIG. 14B illustrates a view of an exemplary satellite communications dish, in accordance with at least one embodiment.

FIG. 14C illustrates an exemplary view of a close-up of components within a circle of FIGS. 14A and 1405A, in accordance with at least one embodiment.

DETAILED DESCRIPTION

Figure 1A:
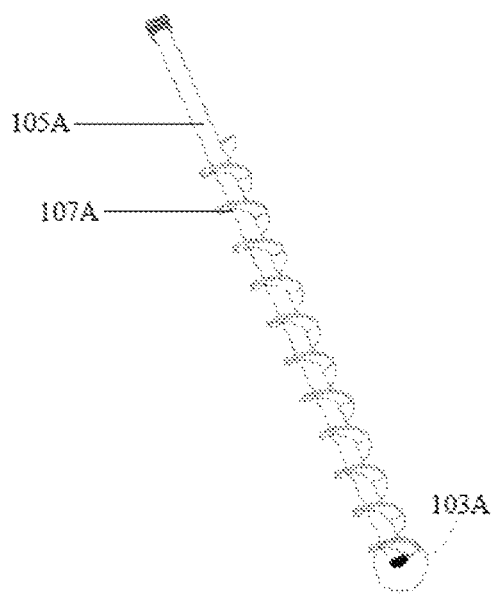
FIG. 1A illustrates a view of an exemplary hollow shaft injection drill bit screw without perforations, in accordance with at least one embodiment.

The present disclosure is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Methods of the present invention may be implemented by performing or completing manually, automatically, or a combination thereof, selected steps or tasks. The term "method" refers to manners, means, techniques, and procedures for accomplishing a given task including, but not limited to, those manners, means, techniques, and procedures either known to, or readily developed from known manners, means, techniques and procedures by practitioners of the art to which the invention belongs. The descriptions, examples, methods, and materials presented in the claims and the specification are not to be construed as limiting but rather as illustrative only. Those skilled in the art will envision many other possible variations within the scope of the technology described herein.

The invention teaches an aperture assembly for a subsurface ejection vessel such as a tube or hollow shaft drilling device supported in a cylindrical or polygonal shape which sealing segment may include in one embodiment a surface seal of a tube or hollow drilling mechanism, to facilitate constituent material ejection from the tube or hollow shaft drilling mechanism and subsequent sub-surface injection. Embodiments include an actuated aperture, which can be triggered singular or multiple times by depth sensor, the timing of drill process, or artificial intelligence eye in coordination with sensors, computer, and or Programmable Logic Controller.

According to a first embodiment of the present invention, it enables the opening and closing of the aperture to enable multiple sub-surface injections within the same strata and or horizon.

According to a second embodiment of the present invention, it enables the constituent loading by sequence and volume for subsequent injection.

According to a third embodiment of the present apparatus, it enables the ejection from the tube and or injection drill bit at specific depths.

According to a fourth embodiment of the present invention, it enables the ejection from the tube and or injection drill bit at specific time intervals.

According to a fifth embodiment of the present invention, it enables multiple loads and reloads of constituents to create larger volume horizons of constituents at specific depths.

According to a sixth embodiment of the present invention, it enables actuation based on proximity to root systems that could happen in concert with Lidar mapping or known root depth of specific plants or trees.

According to a seventh embodiment of the present invention, it enables the injection of a single constituent or multiple constituents either separated by volume and strata for placement or mixed as a slurry or liquid.

According to an eighth embodiment of the present invention, it enables the ejection of living organisms by way of example but is not limited to earth worms and or any eggs, or larva from the hollow shaft or tube into the sub-surface soil.

According to the ninth embodiment of the present invention, the teaching has the potential to increase the global inventory of arable land with appropriate porosity constituents prescriptive for its ternary type. Porosity modification is a function of the shape and size of solid constituents such as but not by way of limitation, aggregates affecting the bulk mass density of the targeted Horizon. Likewise living constituents such as but not by way of limitation, aneic earthworms can improve porosity by penetrating below Horizon A.

DEFINITIONS

"Abrasives": means any Constituent capable of inhibiting smearing. By way of example but not limited to Abrasives include walnut shells, pecan shells, and corn stover.

"Actuated": A device that causes a machine or other device to operate open or close and dispense a volume of material by way of example but not limited to a gate or valve opening or closing.

"Actuated Aperture Closure": a device that causes a machine or other device to operate and close an aperture or open an aperture.

"Amendment Material": can also mean Constituents and or when used herein means any substance known to render a productivity advantage or benefit to sub-optimal soils and/or which provides any remediation benefit to such soils; and includes any biochar, compost, bacterial humus, and soil nutrients, fertilizers and fungi, particularly mycorrhizal fungi and mycorrhizal spores.

"Antimicrobial": is an agent that kills micro-organisms or stops their growth. Antimicrobials can be grouped according to the microorganisms they act primarily against. For example, antibiotics are used against bacteria, and antifungals are used against fungi.

"Aperture": An aperture is a hole or an opening through which can dispense or allow constituents to flow or stop flowing.

"Ball Screw": A high-efficiency feed screw with the ball making a rolling motion between the screw axis and the nut. Compared with a conventional sliding screw, ball screws have drive torque of one-third or less, making them most suitable for saving drive motor power.

"Baits": Any agent that attracts a pest or unwanted organisms. By way of example and not meant to be limiting, Baits for insects are often food-based baits and are an effective and selective method of insect control. Typically, a bait consists of a base material called a carrier (often grain or animal protein) plus a toxicant (most often insecticides by way of example but not limitation organophosphates, carbamates, or pyrethroids) and sometimes an additive (usually oil, sugar, or water) to increase attractiveness. The toxicant part of bait can also be biological rather than chemical. Examples of biological toxicants are *Bacillus thuringiensis* (Bt), parasitic nematodes, and fungi. Many baits are not highly attractive to the insect but instead function as an arrestant. Baits for rodents are generally cereal-based and made of grains such as oats, wheat, barley, corn, or a combination thereof. Formulations may also contain other ingredients such as adherents to bond the toxicant to the grain particles.

"Carbon Brush": A small block of carbon used to convey current between the stationary and moving parts of an electromagnet, electric generator, motor, etc.

"Chemical": This means a compound or substance that has been purified or prepared, especially artificially for purposes of sub-surface amendment, by way of example but not limited to fertilizers, sorption materials like zeolites, fungicides, herbicides, and insecticides. A chemical can mean any basic substance which is used in or produced by a reaction involving changes to atoms or molecules by way of example but is not limited to any liquid, solid, or gas.

"Cloud Computing": is a model for enabling ubiquitous, convenient, on-demand network access to a shared pool of configurable computing resources (e.g., networks, servers, storage, applications, and services) that can be rapidly provisioned and released with minimal management effort or service provider interaction.

"Coil": A length of something wound or arranged in a spiral or sequence of rings.

"Collar": An extension of a Hollow Shaft Injection Drill Bit that can be solid and may be known as an injection drill bit auger extension. It may also be a protection device with or without perforations or windows. Collars may have teeth or burrs to push sub-surface material away from Windows and Apertures.

"Collar Perforations": May be in any shape or pattern by way of example but not limitation the shape of hexagons in the pattern of a honeycomb.

"Collar Window": A Collar with a Window opening.

"Colloids": are uniform mixtures that don't separate or settle out. While colloidal mixtures are generally considered to be homogeneous mixtures, they often display heterogeneous quality when viewed on the microscopic scale. There are two parts to every colloid mixture: the particles and the dispersing medium. The colloid particles are solids or liquids that are suspended in the medium. These particles are larger than molecules, distinguishing a colloid from a solution. However, the particles in a colloid are smaller than those found in a suspension. In smoke, for example, solid particles from combustion are suspended in a gas. Colloids include, Examples of colloids include by way of examples but are not limited to the following fog, smoke, and foam.

"Computer": An electronic device for storing and processing data, typically in binary form, according to instructions given to it in a variable program.

"Cone": A solid or hollow object, which tapers from a circular or roughly circular base to a point.

"Cone Shaped Spillway": A spillway in the shape of a cone whose apex is at the center of the Hollow Shaft Injection Drilling Bit.

"Constituent": Any soil amendment material by way of example but not limitation abrasives, aggregate, amendments, minerals, lime, calcium, calcium carbonate, abrasives, antimicrobials, baits, bio-char, biologicals, bio-mass, carbon including activated, chemicals, colloids, compost, eco colonies, pre cursors to the eco colony, living organisms, inoculants, gas or any other material that can be injected sub surface to change the soil composition and or temperature. Constituents can mean chemical pesticides or natural biologicals for unwanted pests. Solid Constituents can be any polygonal shape, by way of example but are not limitation fines, granules, pellets, briquettes, blocks, or larger fragments that can fit inside and be ejected from a hollow shaft drill bit. Colloids regardless of phase state are considered as constituents. Constituents can contain doses of other constituents. Constituents also include Sorption or Sorbents materials.

"Copper Bands": The windings (C) are flat copper strips to withstand the Lorentz force of the magnetic field. Electricity in the wire gets into the ring to make it into a magnet.

"Coupling, Gear Box Couplings, Gear Box Disc Coupling": Transmit torque from a driving to a driven bolt or shaft tangentially on a common bolt circle. Gear Box couplings are designed to transmit torque between two shafts that are not collinear. They typically consist of two flexible joints—one fixed to each shaft—which are connected by a spindle, or third shaft. A flange within the drawings below or at the top of a gearbox is Disc Couplings.

"Damping": Can refer to the equipment platform, where the substrate is materials by way of example but not limitation granite or plastics that have tensile strength for mounting but have properties to damp vibration and or torque.

"Density": Bulk density, also called apparent density or volumetric density, is a property of powders, granules, and other "divided" solids, especially used in reference to mineral components (soil, gravel), chemical substances.

"Drill Bit" or "Drill Bit Tip": Any device capable of making a subsurface hole when connected to a power source with perforation holes or apertures, which may be any polygon with equal or unequal side lengths, and is manufactured from alloys, steel, titanium, manganese or other materials. The drill bit may contain industrial diamonds for sub-surface injection cavity creation.

"Eco Colony": Any subsurface space that is created by the injection of preferred constituents as established or precursor natural habitat for any specific desirable living organism.

"Eco Colony Pre Cursors": Injected subsurface Eco Colony habitat that is not populated by inhabitant colony.

"Encoders": Encoders are used in machinery for motion feedback and motion control. Encoders are found in machinery in all industries. Encoders (or binary encoders) are the combinational circuits that are used to change the applied input signal into a coded format at the output. These digital circuits come under the category of medium-scale integrated circuits. In our case, they assist in-depth assessment and or achievement. Encoders through communication with PLC, Computer, or AI robotics and other interactive devices can trigger drilling platform ascent or descent or deployment and or retraction stacking of plunger. Depth achievement can trigger dispensing, plunger instructions, reamer wings, continued drilling or ascent, and then descent or repetition of these actions.

"Fastener Ring": A ring feature as part of the Plunger Panel that holds Plunger Panels in shut-stacked, deployed or in the right position, and attached to the motor shaft.

"Feeder Auger": Examples of Feeder Augers that feed the materials to the Drilling Auger or its drilling inner tube, these include Augers with ribs, Feeder Flexible Conveyor Flight Screws, Flexible Conveyor Flight Beveled Round Wire Screws, Flexible Conveyor Flight Beveled Square Wire Screws, Flexible Conveyor Flight Beveled Wire Screws, and Flexible Conveyor Flight Flat Wire Screws.

"Flight Conduit Outer Tubes" or "Flight Tube" or "Conduit Tube": Within this space, a separate channel such as a smaller diameter or perimeter tube is incorporated into the side wall or an appendix to a Conduit Tube.

"Flange": Is a rim. Where a flange appears in a drawing associated with a hollow shaft injection drill bit can also mean a Gear Box Coupling and or Gear Box Disc Coupling. A flange can also be a chord and part of the internal diameter of the Tube.

"Gear Box": The gearbox is a mechanical device used to increase the output torque or to change the speed (RPM) of a motor. The shaft of the motor is connected to one end of the gearbox and through the internal configuration of gears of a gearbox, provides a given output torque and speed determined by the gear ratio.

"GPS" "Global Positioning Satellite": An accurate worldwide navigational and surveying facility based on the reception of signals from an array of orbiting satellites.

"Electromagnet Coil": An electromagnetic coil is an electrical conductor such as a wire in the shape of a coil, spiral, or helix. It can be used to implement contactless position or proximity sensing. The field produced by the current in one coil induces a corresponding current in an adjacent coil, as in a power transformer. If, however, the second coil is mobile, the induced current is reduced as the distance increases.

"Electromagnetic Spring Aperture": An actuated opening

"Electro-Magnetic Spring Injection Drill Bit Aperture Cap": An actuated opening at the end of a Hollow Shaft Injection Drilling Bit or Auger or Tube.

"Electromagnet Window Aperture": An actuated opening usually vertical.

"Electromagnet Wires": Negative and or Positive Wire.

"Extension Spring": An aperture spring that is composed of multiple springs to deploy the spring cap panel segment of an aperture closure.

"Hollow Shaft": Any injection auger and or drill bit space between the walls, space may be cylindrical or any polygonal shape.

"Hollow Shaft of Injection Drilling Auger": A corkscrew and has multiple parts: collar, bottom aperture, window aperture, spillway, perforations, wings, screw, spurs, cutting edges, twist, shank, and in some cases a tang. Expansive auger bits have adjustable blades with cutting edges and spurs that can be extended radially to cut large holes.

"Hollow Shaft Injection Drilling Bit": Auger bits have adjustable blades with cutting edges and spurs that can be extended radially to cut large holes.

"Hollow Shaft Injection Drill Bit Screw Rib": Any rib on the side of the shaft of an auger drill bit or any drill bit.

"Induction Sensors" or "IS" are based on the eddy current principle and designed for non-contact measurement of displacement, distance, position, oscillation, and vibrations. Induction sensors (IS) are particularly suitable when high precision is required in harsh industrial environments (pressure, dirt, temperature).

"injection Drilling Bit": Maybe bayonet, flat, impregnated head, screw, auger, fish tail, or any shape that can penetrate a sub-surface. Any hollow shaft device of any polygonal width or diameter that is capable of penetration of ice, soil, rock, and or mineral.

"Injection Drill Bit Auger Extension": A connection segment for devices used in sub-surface operations. Some examples are Windows, Apertures, and Wings.

"Injection Drill Bit Screw": A tapered shape drilling bit or cylindrical shape with threads like a screw, with or without perforations.

"Inoculants": A constituent (a virus or toxin or immune serum) that is introduced into the sub-surface of the soil to produce or increase immunity to an undesirable living organism.

"Insulation": A material in which electric current does not flow freely.

"Lead Screw": A threaded rod that drives the platform tool carriage in a drill or drilling array when subsurface drilling. Lead Screw can also be a Ball Screw, Worm Screw or Worm Gear.

"Limit Switch": a switch preventing the travel of an object in a mechanism past some predetermined point, mechanically operated by the motion of the object itself. Limit Switches are found in machinery in all industries. In this application assist in communicating depth achievement for ascent or descent communicating to PLC, Computer, or AI robotics and other interactive devices. Depth achievement can trigger dispensing, plunger instructions, reamer wings, continued drilling or ascent, and then descent or repetition of these actions. A Limit Switch can refer to a plurality.

"Living Organisms": An individual form of life, by way of example but not limitation a bacterium, protist, fungus, plant, or animal, composed of a single cell or a complex of cells in which organelles or organs work together to carry out the various processes of life, including in some circumstances virus.

"Magnetic Metals": Include ferromagnetic metals by way of example but not limited to iron, nickel, cobalt, gadolinium, dysprosium, and alloys by way of example but not limitation steel that also contain specific ferromagnetic metals such as iron or nickel.

"Minerals": A solid chemical compound with fairly well-defined chemical composition and a specific crystal structure that occurs naturally in pure form.

"Negative Wire": if you have a wire where both sides are the same color, which is typically copper, the strand that has a grooved texture is the negative wire.

"Open Window": A window that is not closed by actuation of an aperture or without cover. Or a window with a perforation pattern.

"Open Window Aperture": Is a polygon shape window that opens and closes via actuation.

"Organic Matter": Organic matter, organic material, or natural organic matter refers to the large source of carbon-based compounds found within natural and engineered, terrestrial, and aquatic environments. It is matter composed of organic compounds that have come from the feces and remains of organisms such as plants and animals. In soils, dead matter makes up roughly 85% of the organic matter. Organic matter includes dead matter, living microbes, and living parts of plants (e.g., roots). Organic Matter includes the four basic types pure substance that cannot be broken down into other types of substances; lipid organic compound such as fat or oil; matter anything that takes up space and has mass; monosaccharide simple sugar such as glucose that is a building block of carbohydrates; nucleic acid organic compound such as DNA or RNA; nucleotide.

"Perforation": Any polygonal shape that is a hole within a shaft, collar, guard, or tube. Perforations enable dispensing, injection, and ejection of constituents both vertically and laterally.

"PLC": A programmable logic controller (PLC) is a small, modular solid-state computer with customized instructions for performing a particular task. PLCs, which are used in industrial control systems (ICS) for a wide variety of industries, have largely replaced mechanical relays, drum sequencers, and cam timers. PLCs are used for repeatable processes and have no mechanical parts and they can gather information from sensors. PLC can also mean a computer, and or remote cloud computer.

"Polygon": a plane figure with at least three straight sides and angles, and typically five or more.

"Porosity Soil" or "Soil Porosity": refers to the quantity of pores, or open space, between soil particles. Pore spaces may be formed due to the movement of roots, worms, and insects; expanding gases trapped within these spaces by groundwater; and/or the dissolution of the soil's parent material. Soil texture can also affect soil porosity. There are three main soil textures: sand, silt, and clay. Sand particles have diameters between 0.05 and 2.0 mm (visible to the naked eye) and are gritty to the touch. Silt is smooth and slippery to the touch when wet, and individual particles are between 0.002 and 0.05 mm in size. Clay is less than 0.002 mm in size and is sticky when wet. The differences in the size and shape of sand, silt, and clay influence the way the soil particles fit together, and thus their porosity.

"Positive Wire": The positive wire, also commonly called the hot wire, is usually black. It is the source of electricity.

"Process Methodology Diagram": An illustrative process step by step to show the function of an embodiment.

"Protrusion Jacket": Socket and or Cavity with walls that hold connections for wires, insulation to carbon brushes "Rib of Drill Bit": Any rib on the side of the shaft of an auger drill bit or any drill bit.

"Revolutions Per Minute or RPM": The speed of a motor

"Router": is a network hardware device equipped with a cellular hot spot that allows making communication between the internet and all devices which are linked to the internet in your house and office. A router has responsible to receives, analyze, and forwarding all data packets from the modem and transferring it to the destination point.

"Satellite Dish": a bowl-shaped antenna with which signals are transmitted to or received from a communications satellite.

"Shaft of Injection Drilling Auger": Connection Section to other components of Drilling Auger or Drilling Auger Bit.

"Slip Ring" or "Slip Ring Bore Hole": a ring in a dynamo or electric motor which is attached to and rotates with the shaft, passing an electric current to a circuit via a fixed brush pressing against it. A Slip Ring with a hollow shaft creates a bore hole for an injection drill bit shaft.

"Sorption" or "Sorbents" Are Constituents capable of adsorbing/absorbing one or more constituents in gas, fluid, liquid, or a mixture thereof. Examples include activated carbon, atomic particles, bio-char, carbon materials, activated carbon, carbon nanotubes, catalysis, graphene, metal hydrides, nanoparticles, nano-structured materials, polymeric organic frameworks, silica, silica gel, clay, zeolites, other adsorbents/absorbents, or combination thereof. Useful adsorbents/absorbents, by way of example but not limitation carbon materials, have high surface areas and a high density of pores with optimal diameter. Sorption or Sorbents can be different types of activated charcoal and zeolites. Sorption or Sorbents may also be combinations that vary by type(s) of metal ions and/or organic material(s) used, and may be made in molecular clusters or molecular chains to obtain the desired quality, i.e. type of adsorption/absorption, and volume capacity in terms of the desired porosity. Examples of Sorption or Sorbents also include constituents byway of example but are not limited to Bio-Char and Zeolites.

"Spillway": A polygonal shape often likes a cone or other shape with an incline and or peak.

"Spring": An elastic or metal body or device that recovers its original shape when released after being distorted.

"Spring Aperture Cap Panel Segment": An aperture spring that is composed of multiple springs to deploy Cap Panel Segments to complete a Cap for aperture deployment in a closed position.

"Subsoil": is the layer of soil below the topsoil. The layer of soil closest to our feet is topsoil. Geologists refer to it as the "A" horizon, whereas subsoil is the "B" horizon. Topsoil is much more fertile than subsoil because it contains more organic matter, thus giving it a darker color. As per the soil profile, this is a kind of soil that lies below the surface soil but above the bedrocks. It is also called undersoil or B Horizon soil. It lies between C Horizon and E Horizon. The B Horizon predominantly consists of leached materials as well as minerals such as iron and aluminum compounds. Living Organisms aid Horizon A fertility but these organisms because of Porosity spend very little time below Horizon A.

"Suspended": Suspended is defined as suspension which is a heterogeneous mixture in which the solute particles do not dissolve but get suspended throughout the bulk of the medium. Emulsions are a type of suspension, where two immiscible liquids are mixed together. Any constituents that are liquid or particle held in suspension.

"Suspensions": An emulsion is a suspension of two liquids that usually do not mix together. These liquids that do not mix are said to be immiscible. An example would be oil and water.

"Window": A polygonal shape by way of example but not limitation a circumferential rectangle that enables the flow of constituents from the Shaft of Injection Drilling Auger sub surface.

"Window Vertical Aperture": A side shaft window rather than a bottom window of the Shaft of the Injection Drilling Auger.

"Open Window Aperture": Is a polygon shape window that opens and closes via actuation.

"Worm Screw and Worm Gear": Used to transmit motion and power when a high-ratio speed reduction is required. Worm Screws and Worm Gears accommodate a wide range of speed ratios.

"Zeolites": Any of various hydrous silicates that are analogous in composition to the feldspars, occur as secondary minerals in cavities of lavas, and can act as ion-exchangers. Any of various natural or synthesized silicates of similar structure are used especially in water softening and as adsorbents and catalysts. Zeolites offer the capability of salinity and boron remediation. Clinoptilolite (a naturally occurring zeolite) is used as a soil treatment in agriculture. It is a source of potassium that is released slowly. They can adsorb effluent and ammonia, and subsequently be used as soil nutrients.

FIG. 1A illustrates a view of an exemplary hollow shaft injection drill bit screw without perforations, in accordance with at least one embodiment. FIG. 1A depicts an electromagnetic spring injection drill bit aperture cap 103A, injection drilling bit with hollow shaft and no perforations 105A, and injection drilling bit with hollow shaft 107A.

Figure 1B:
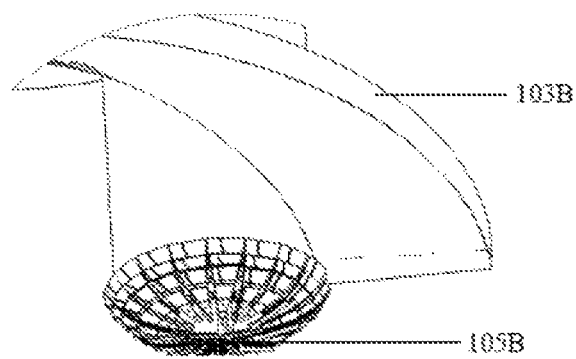
FIG. 1B illustrates a view of an exemplary close-up of FIGS. 1A and 103A an electromagnetic spring injection drill bit cap, in accordance with at least one embodiment.

FIG. 1B illustrates a view of an exemplary close-up of FIGS. 1A and 103A an electromagnetic spring injection drill bit cap, in accordance with at least one embodiment. FIG. 1B depicts an injection drill bit screw 103B, and a close-up of FIGS. 1a and 103a an electromagnetic spring injection drill bit cap 105B.

Figure 2:
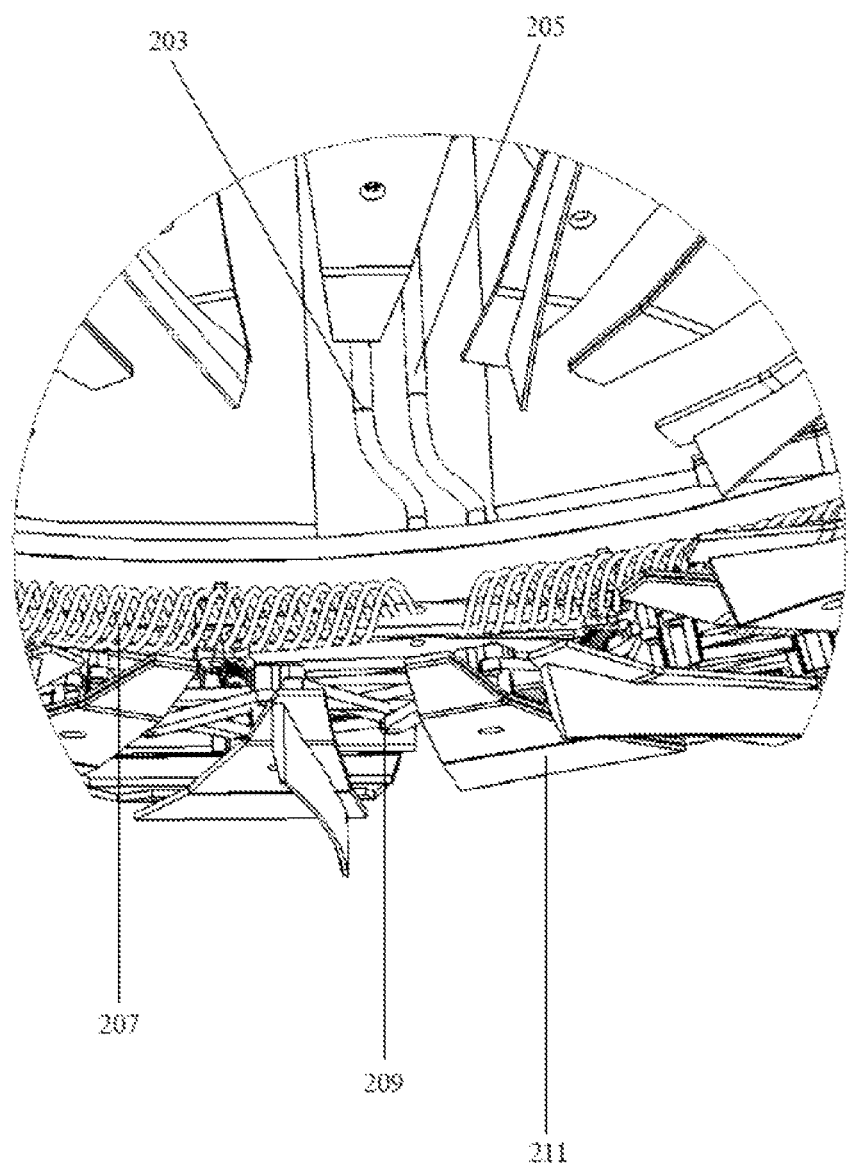
FIG. 2 illustrates a view of an exemplary expanded close-up of FIGS. 1B and 105B an electromagnetic spring injection drill bit cap, in accordance with at least one embodiment.

FIG. 2 illustrates a view of an exemplary expanded close-up of FIGS. 1B and 105B an electromagnetic spring injection drill bit cap, in accordance with at least one embodiment. FIG. 2 depicts a positive wire 203, negative wire 205, spring 207, extension spring 209, and a spring aperture cap panel segment 211.

Figure 3A:
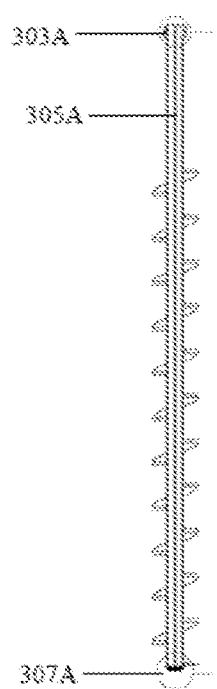
FIG. 3A illustrates a view of an exemplary cross-section of an injection hollow shaft drill bit, in accordance with at least one embodiment.

FIG. 3A illustrates a view of an exemplary cross-section of an injection hollow shaft drill bit, in accordance with at least one embodiment. FIG. 3A depicts a cross-section of area for electromagnet wires, copper bands, insulation, carbon brushes and spring 303A, positive and negative wires 305A, and an electromagnet spring cap 307A.

Figure 3B:
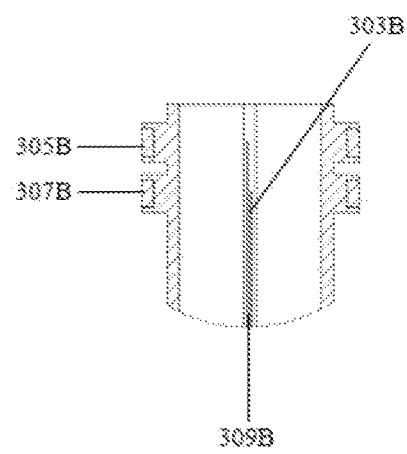
FIG. 3B illustrates a view of an exemplary cross-section showing wires feeding FIGS. 3A and 303A electromagnet, in accordance with at least one embodiment.

FIG. 3B illustrates a view of an exemplary cross-section showing wires feeding FIGS. 3A and 303A electromagnet, in accordance with at least one embodiment. FIG. 3B depicts a positive wire 303B, cross-section expanded view of the area for electromagnet wires, copper bands, insulation, carbon brushes, and spring 305B, cross-section expanded view of the area for electromagnet wires, copper bands, insulation, carbon brushes, and spring 307B, and a negative wire 309B.

Figure 3C:
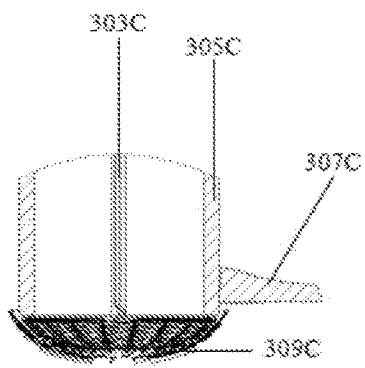
FIG. 3C is a view of an exemplary cross-section showing wires feeding FIGS. 3A and 307A electromagnet spring cap for 3A, in accordance with at least one embodiment.

FIG. 3C is a view of an exemplary cross-section showing wires feeding FIGS. 3A and 307A electromagnet spring cap for 3A, in accordance with at least one embodiment. FIG. 3C depicts a cross-section close-up view of negative and positive wires 303C, a non-perforated wall of injection hollow shaft drill bit 305C, a rib of drill bit 307C, and a cross-section expanded view of FIG. 2 309C.

Figure 4A:
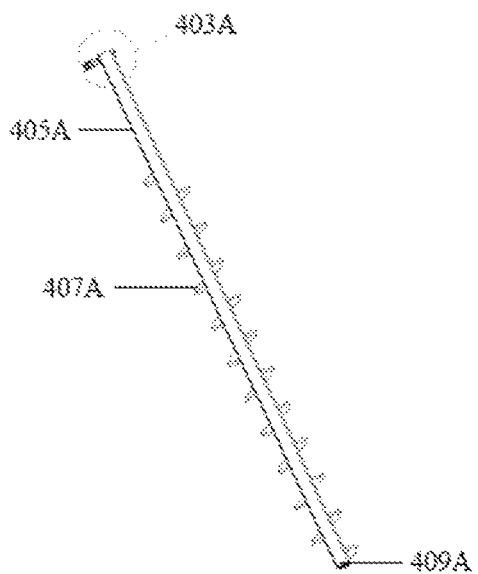
FIG. 4A illustrates a view of an exemplary cross-section of a hollow shaft injection drill bit, in accordance with at least one embodiment.

FIG. 4A illustrates a view of an exemplary cross-section of a hollow shaft injection drill bit, in accordance with at least one embodiment. FIG. 4A depicts an electromagnet and wiring 403A, a hollow shaft injection drill bit 405A, a hollow shaft injection drill bit screw rib 407A, and an open bottom of hollow shaft injection drill bit 409A.

Figure 4B:
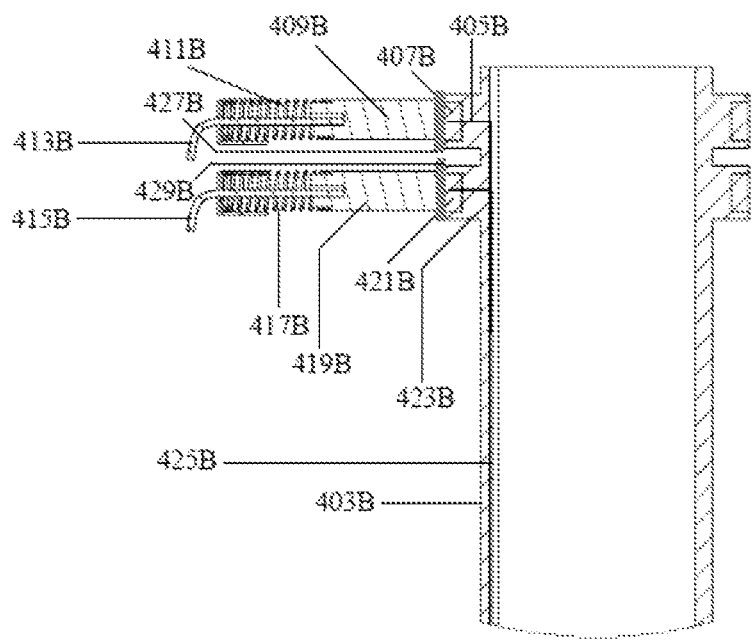
FIG. 4B illustrates a view of an exemplary cross-section of FIG. 4A and close up of 403A showing electromagnet that powers FIG. 2, in accordance with at least one embodiment.

FIG. 4B illustrates a view of an exemplary cross-section of FIG. 4A and close up of 403A showing electromagnet that powers FIG. 2, in accordance with at least one embodiment. FIG. 4B depicts a wall of hollow shaft injection drill bit 403B, a positive wire 405B, insulation 407B, a carbon brush 409B, spring 411B, a positive wire 413B, a negative wire 415B, spring 417B, carbon brush 419B, insulation 421B, protrusion jacket 423B, negative wire 425B, copper bands 427b, and copper bands 429B.

Figure 5A:
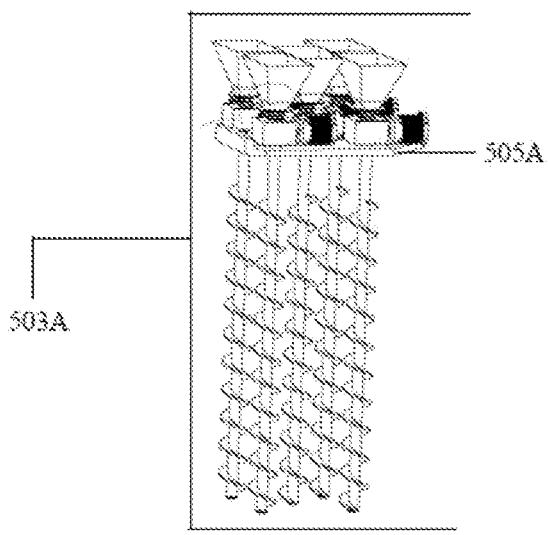
FIG. 5A illustrates a view of an exemplary hollow shaft injection drill bit assembly without perforations, in accordance with at least one embodiment.

FIG. 5A illustrates a view of an exemplary hollow shaft injection drill bit assembly without perforations, in accordance with at least one embodiment. FIG. 5A depicts hollow shaft injection drill bit assembly without perforations 503A and a platform 505A.

Figure 5B:
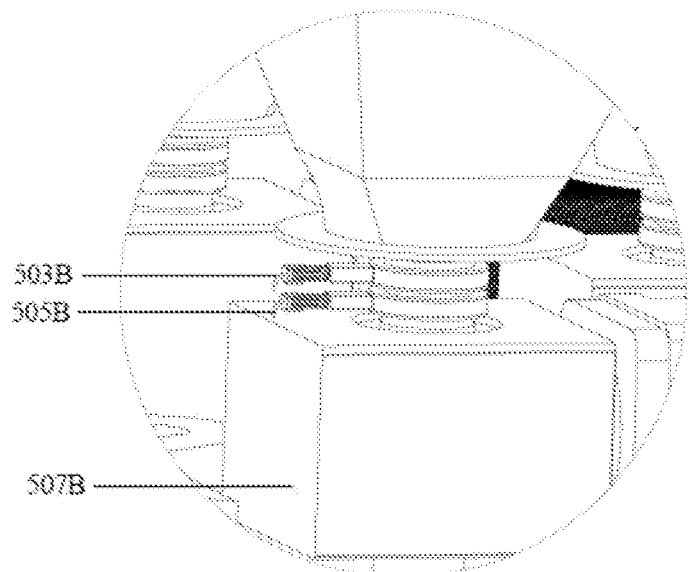
FIG. 5B illustrates a view of an exemplary electromagnet within the hollow shaft injection drill bit assembly without perforations, showing position within the assembly, in accordance with at least one embodiment.

FIG. 5B illustrates a view of an exemplary electromagnet within the hollow shaft injection drill bit assembly without perforations, showing position within the assembly, in accordance with at least one embodiment. FIG. 5B depicts a positive wire 503B, negative wire 505B, and a gear box 507B.

Figure 6A:
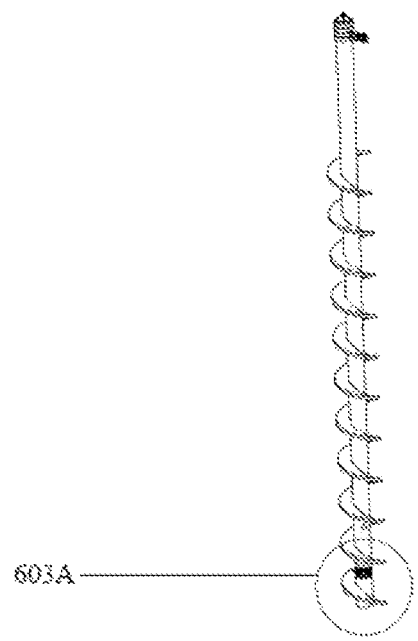
FIG. 6A illustrates a view of an exemplary hollow shaft injection drill bit with a call out for close-up as seen in FIG. 61B, in accordance with at least one embodiment.
Figure 6B:
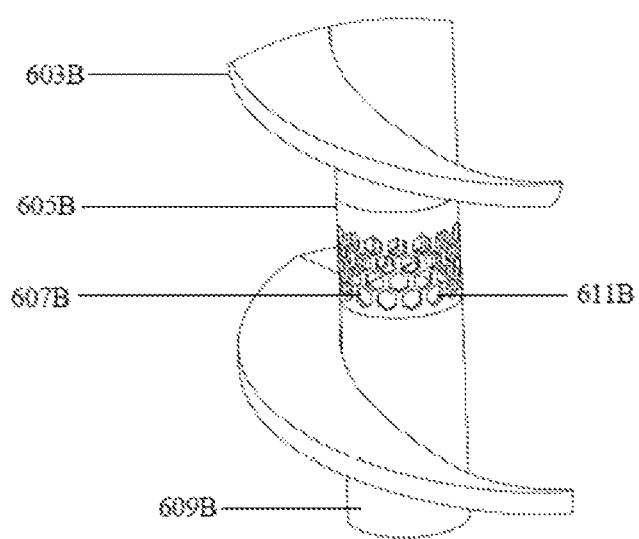
FIG. 6B illustrates a close-up view of an exemplary collar with cone-shaped spillway and hexagon perforations, in accordance with at least one embodiment.

FIG. 6A illustrates a view of an exemplary hollow shaft injection drill bit with a call-out for close-up as seen in FIG. 6B, in accordance with at least one embodiment. FIG. 6A depicts a call-out for a close-up view of FIG. 6B 603A.

FIG. 6B illustrates a close-up view of an exemplary collar with cone-shaped spillway and hexagon perforations, in accordance with at least one embodiment. FIG. 6B depicts a hollow injection drill bit rib 603B, a collar 605B, collar perforations in the shape of hexagons honey comb whose edge is beveled to create tooth 607B, injection drill bit extension 609B, and a cone-shaped spillway 611B.

Figure 7A:
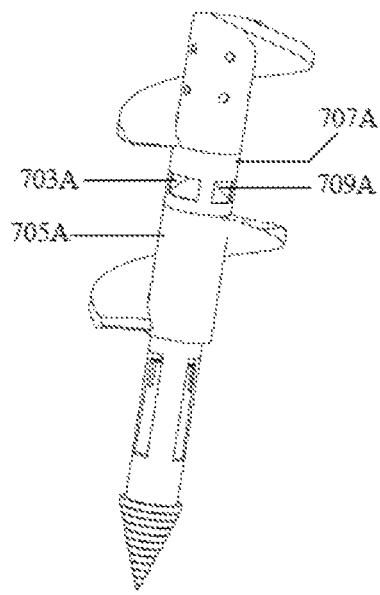
FIG. 7A illustrates a view of an exemplary collar, collar window, and spillway without aperture closure, in accordance with at least one embodiment.

FIG. 7A illustrates a view of an exemplary collar, collar window, and spillway without aperture closure. FIG. 7A depicts a collar window 703A, an injection drill bit auger extension 705A, collar 707A, and a cone-shaped spillway 709A.

Figure 7B:
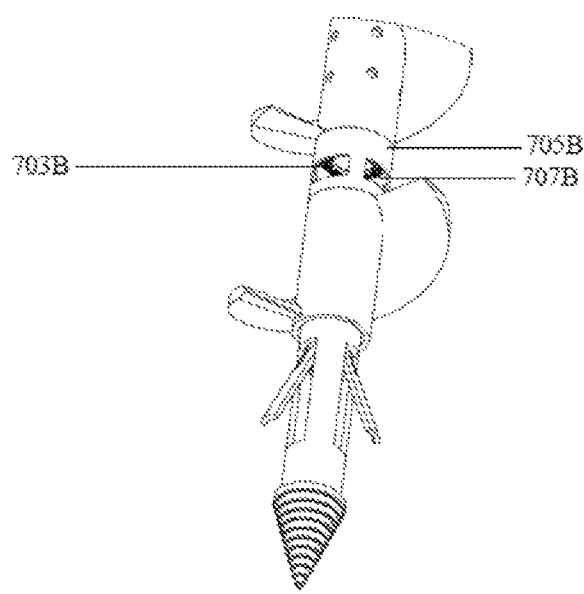
FIG. 7B illustrates a view of an exemplary collar, collar window with actuated aperture closure, in accordance with at least one embodiment.

FIG. 7B illustrates a view of an exemplary collar, collar window with actuated aperture closure, in accordance with at least one embodiment. FIG. 7B depicts an electromagnetic spring aperture 703B, collar 705B, and a collar window 707B.

Figure 8A:
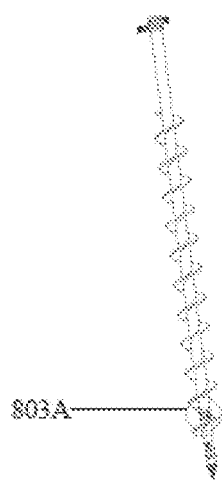
FIG. 8A is a view of an exemplary call out of an open window aperture close-up view as seen in FIG. 8C, in accordance with at least one embodiment.
Figure 8B:
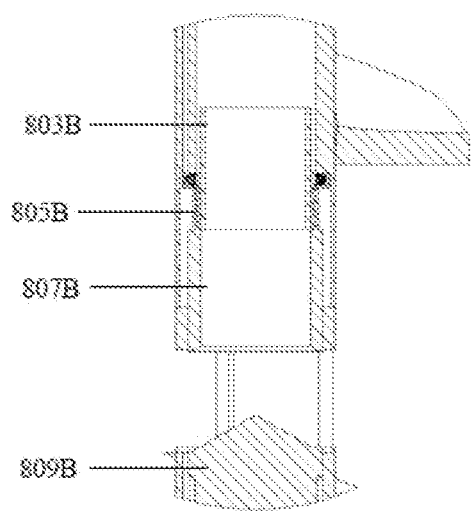
FIG. 8B illustrates a view of an exemplary cut-through view of electromagnet window aperture in an open state, in accordance with at least one embodiment.
Figure 8C:
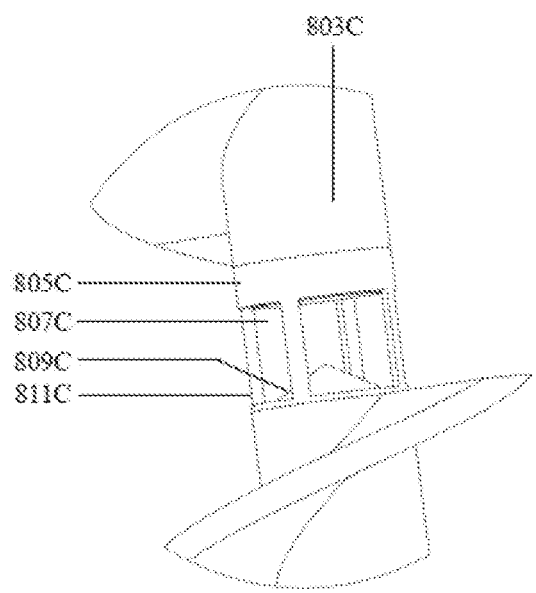
FIG. 8C illustrates a view of an exemplary electromagnet window aperture in an open state, in accordance with at least one embodiment.

FIG. 8A is a view of an exemplary call out of an open window aperture close-up view as seen in FIG. 8C, in accordance with at least one embodiment. FIG. BA depicts a call out of an open window aperture close view as seen in FIG. 8C 803A.

FIG. 8B illustrates a view of an exemplary cut-through view of electromagnet window aperture in an open state, in accordance with at least one embodiment. FIG. 8B depicts a window aperture in open position 803B, an electromagnet spring 805B, an aperture opening 807B, and a spillway cone 809B.

FIG. 8C illustrates a view of an exemplary electromagnet window aperture in an open state, in accordance with at least one embodiment. FIG. 8C depicts a hollow shaft of injection drill bit auger 803C, collar 805C, aperture opening 807C, and spillway cone 809C.

Figure 9A:
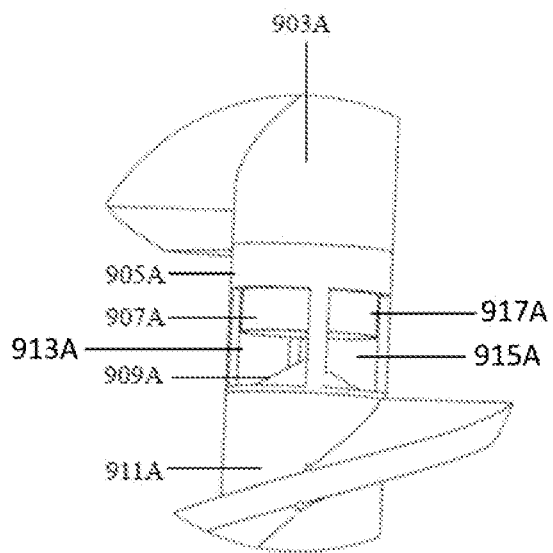
FIG. 9A illustrates a view of an exemplary electromagnet window aperture that is partially closed, in accordance with at least one embodiment.

FIG. 9A illustrates a view of an exemplary electromagnet window aperture that is partially closed, in accordance with at least one embodiment. FIG. 9A depicts a hollow shaft of injection drilling auger 903A, collar 905A, partially closed window aperture 907A, a cone-shaped spillway 909A, and a shaft of injection drilling auger 911A, window 913A, a window 915A, and a partially closed window aperture 917A.

Figure 9B:
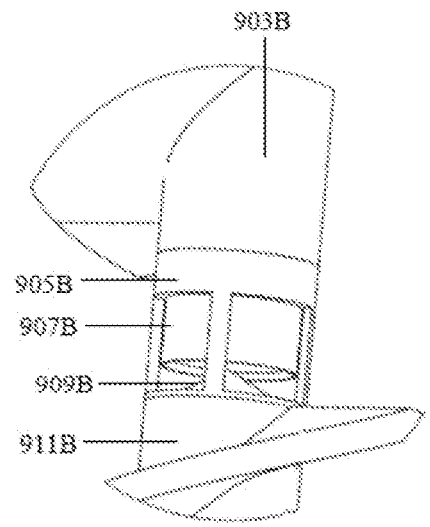
FIG. 9B is a view of an exemplary electromagnet window aperture that is three-quarters of the way closed, in accordance with at least one embodiment.

FIG. 9 B is a view of an exemplary electromagnet window aperture that is three-quarters of the way closed, in accordance with at least one embodiment. FIG. 9B depicts a hollow shaft of injection drilling auger 903B, collar 905B, three-quarters closed window aperture 907B, a cone-shaped spillway 909B, and a shaft of injection drilling auger 911B.

Figure 9C:
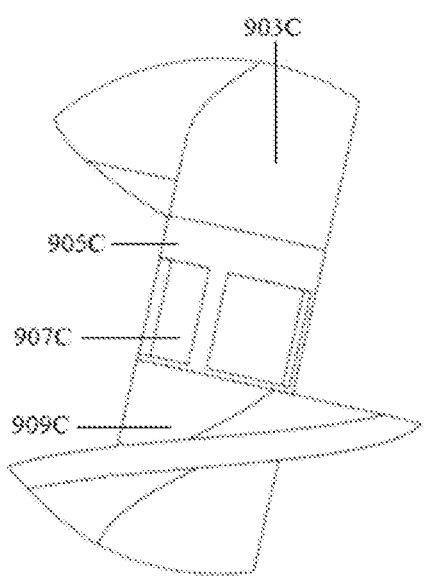
FIG. 9C illustrates a view of an exemplary electromagnet window aperture that is closed, in accordance with at least one embodiment.

FIG. 9C illustrates a view of an exemplary electromagnet window aperture that is closed, in accordance with at least one embodiment. FIG. 9C depicts a hollow shaft of injection drilling auger 903C, collar 905C, closed window aperture 907C, and a shaft of injection drilling auger 909C.

FIG. 0A illustrates an exemplary view of call-outs of a hollow shaft drilling auger as seen in FIG. 10C, in accordance with at least one embodiment. FIG. 10A depicts an electromagnet coil, negative and positive wires 1003A, and a window vertical aperture 1005A.

FIG. 10B illustrates a view of an exemplary view of wires, insulation, carbon brush, and other electromagnet components, in accordance with at least one embodiment. FIG. 10B depicts a coil 1003B, insulation 1005B, a positive wire 1007B, a negative wire 1009B, and a shaft of injection drilling auger 1011B.

FIG. 10C illustrates a transparent view of an exemplary bottom section of an electromagnet that controls an aperture, in accordance with at least one embodiment. FIG. 10C depicts electrical wires 1003C, a spring 1005C, insulation 1007C, a window vertical aperture 1009C, and a cone spillway 1011C.

Figure 11A:
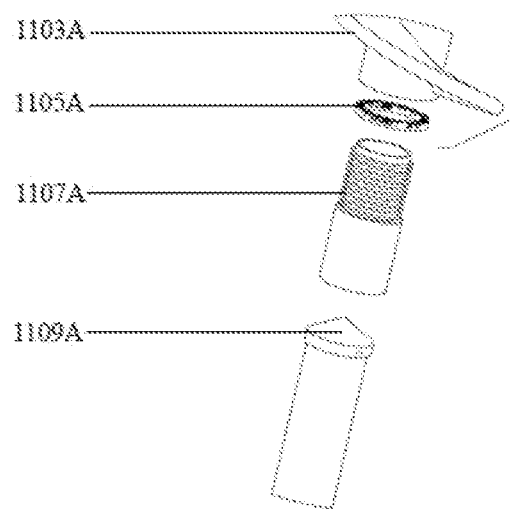
FIG. 11A illustrates an exploded lower components view of an exemplary electromagnet and aperture exit, in accordance with at least one embodiment.

FIG. 11A illustrates an exploded lower components view of an exemplary electromagnet and aperture exit, in accordance with at least one embodiment. FIG. 11A depicts a hollow shaft of injection drill 1103A, a coil 1105A, spring 1107A, and a cone-shaped spillway 1109A.

Figure 11B:
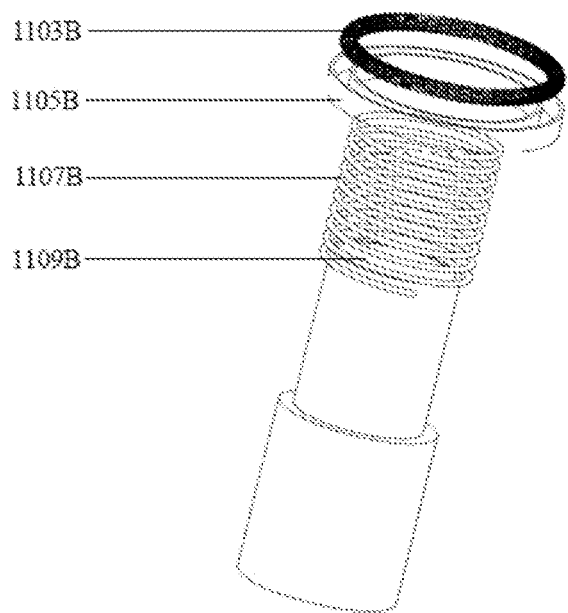
FIG. 11B illustrates an exploded view of an exemplary coil, spring, and insulation, in accordance with at least one embodiment.

FIG. 11B illustrates an exploded view of an exemplary coil, spring, and insulation, in accordance with at least one embodiment. FIG. 11B depicts a coil 1103B, insulation 1105B, spring 1107B, and cone-shaped spillway 1109B.

Figure 12:
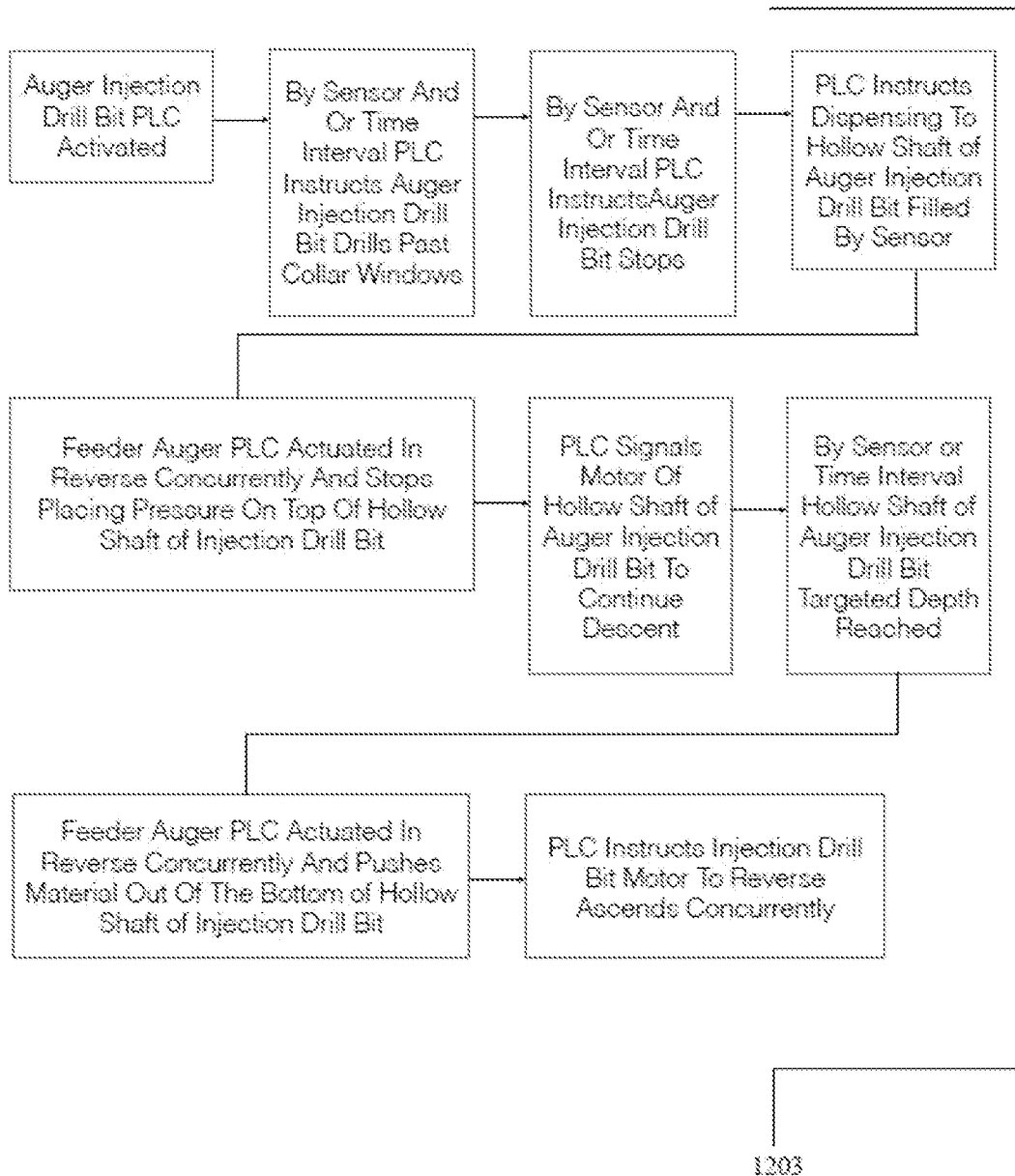
FIG. 12 is a view of an exemplary example diagram of one of many AI robotically, computer, PLC, and or sensor-controlled potential process methodologies for use with an embodiment, in accordance with at least one embodiment.

FIG. 12 is a view of an exemplary example diagram of one of many AI robotically, computer, PLC, and or sensor-controlled potential process methodologies for use with an embodiment, in accordance with at least one embodiment. FIG. 12 depicts a process methodology diagram 1203.

Figure 13:
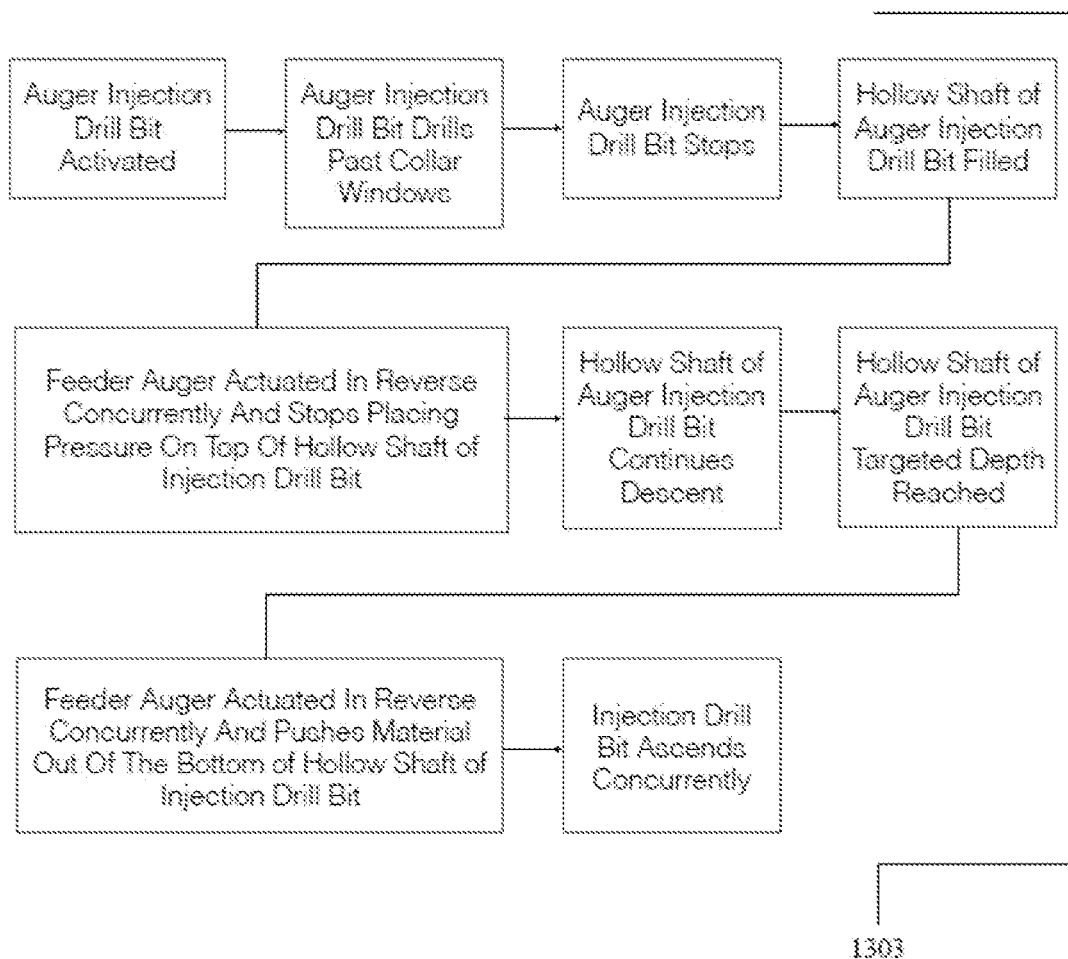
FIG. 13 illustrates a view of an exemplary example diagram of one of many potential process methodologies for use with an embodiment, in accordance with at least one embodiment.

FIG. 13 illustrates a view of an exemplary example diagram of one of many potential process methodologies for use with an embodiment, in accordance with at least one embodiment. FIG. 13 depicts a process methodology diagram 1303.

FIG. 14A illustrates a view of an exemplary communications platform of an injection drilling trailer with components seen in FIG. 14B and FIG. 14C, in accordance with at least one embodiment. FIG. 14A depicts a satellite communications dish 1403A, and a communications platform containing components seen in FIG. 14C 1405A.

FIG. 14B illustrates a view of an exemplary satellite communications dish, in accordance with at least one embodiment. FIG. 14B depicts a satellite communications dish 1403B.

FIG. 14C illustrates a view of an exemplary close-up of components within the circle of FIGS. 14A and 1405A, in accordance with at least one embodiment. FIG. 14C depicts a fuel cell 1403C, a PLC 1405C, AI robot 1407C, a router 1409C, a computer 1411C, and a GPS 1413C.

Figure 15:
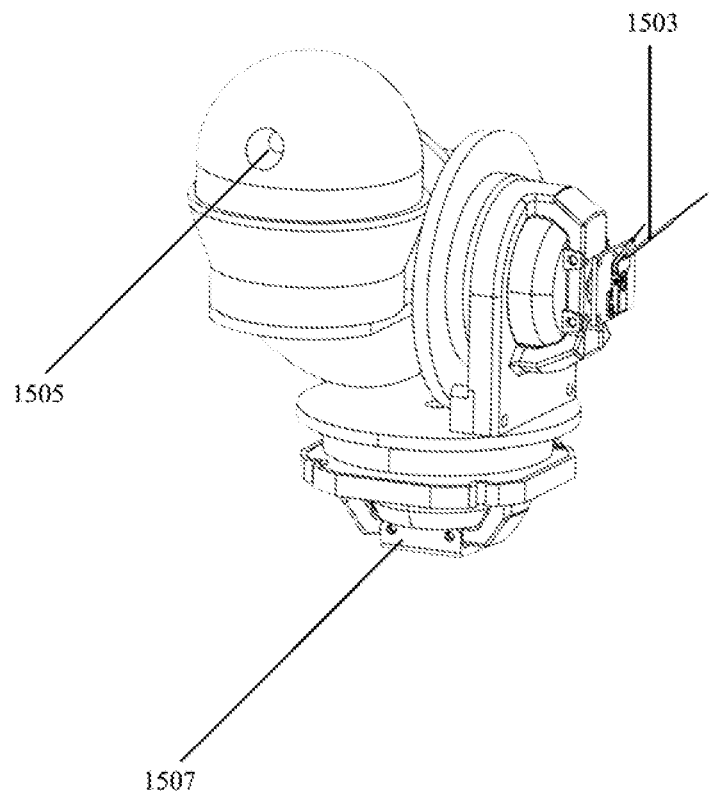
FIG. 15 illustrates an exemplary view of the AI robot, in accordance with at least one embodiment.

FIG. 15 illustrates a view of an exemplary AI robot, in accordance with at least one embodiment. FIG. 15 depicts a camera lens 1503, gimbal 1505, and an antenna 1507.

Figure 16A:
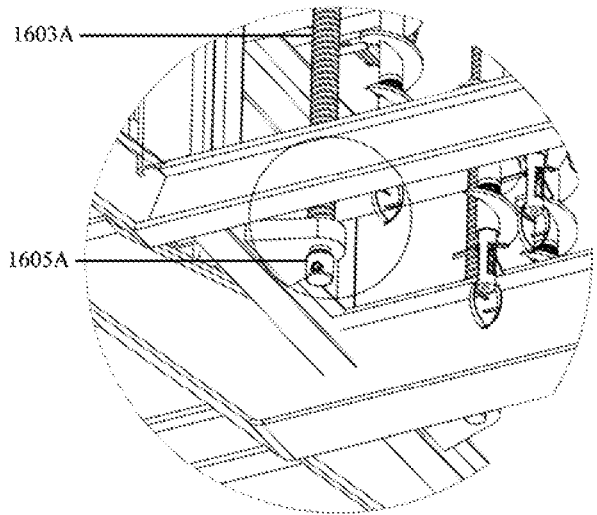
FIG. 16A illustrates an exemplary view of the encoder for lead screw revolution counting, in accordance with at least one embodiment.

FIG. 16A illustrates a view of an exemplary encoder for lead screw revolution counting, in accordance with at least one embodiment. FIG. 16A depicts a lead screw 1603A, and an encoder 1605A.

Figure 16B:
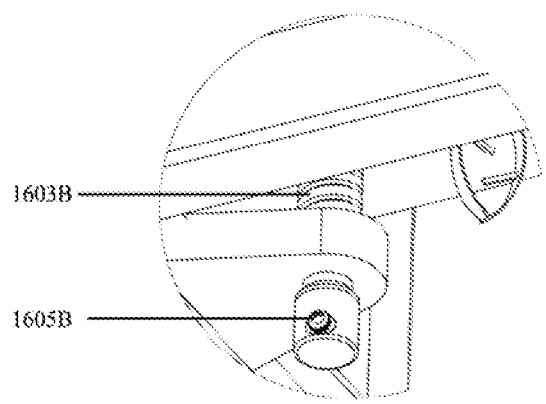
FIG. 16B illustrates an exemplary view of a close-up of FIG. 16A is an encoder for lead screw revolution counting, in accordance with at least one embodiment.

FIG. 16B illustrates a view of an exemplary is a close up of FIG. 16A is an encoder for lead screw revolution counting, in accordance with at least one embodiment. FIG. 16B depicts a lead screw 1603B, and an encoder 1605B.

Figure 17:
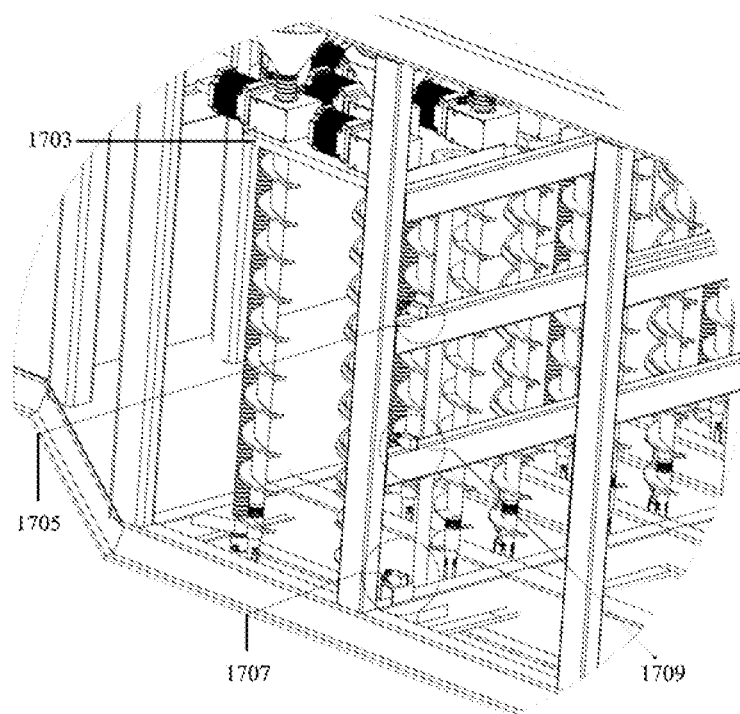
FIG. 17 illustrates an exemplary view of three limit switches, in accordance with at least one embodiment.

FIG. 17 illustrates a view of an exemplary view of three limit switches, in accordance with at least one embodiment. FIG. 17 depicts an injection drill bit array platform 1703, a limit switch 1705, a limit switch 1707, a limit switch 1709, a hollow shaft injection drill bit 1711, and a lead screw 1713.

Figure 18A:
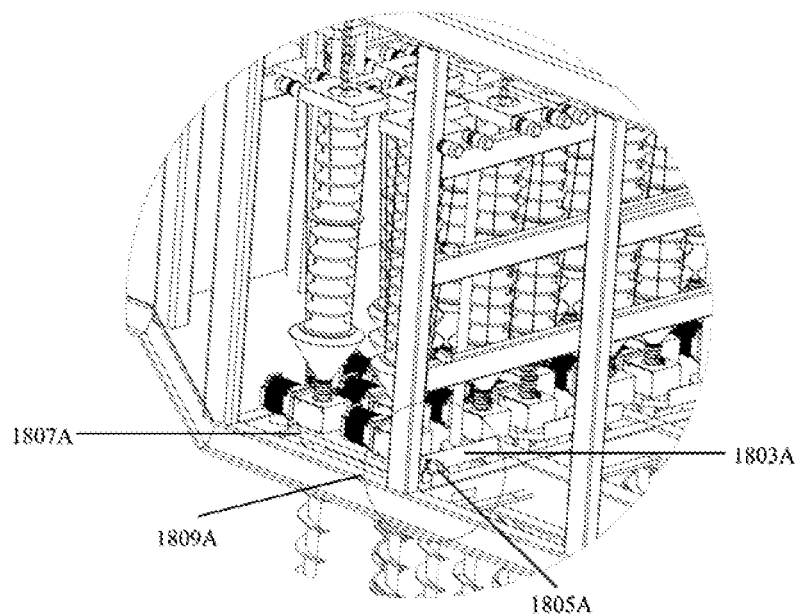
FIG. 18A illustrates an exemplary view of the limit switch that has been tripped by the injection drilling array platform having traveled to its limit setting, in accordance with at least one embodiment.

FIG. 18A illustrates a view of an exemplary limit switch that has been tripped by the injection drilling array platform having traveled to its limit setting, in accordance with at least one embodiment. FIG. 18A depicts a back wall of drilling array platform 1803A, a limit switch 1805A, drilling array platform 1807A, and a call out for close up of FIG. 10B 1809A.

Figure 18B:
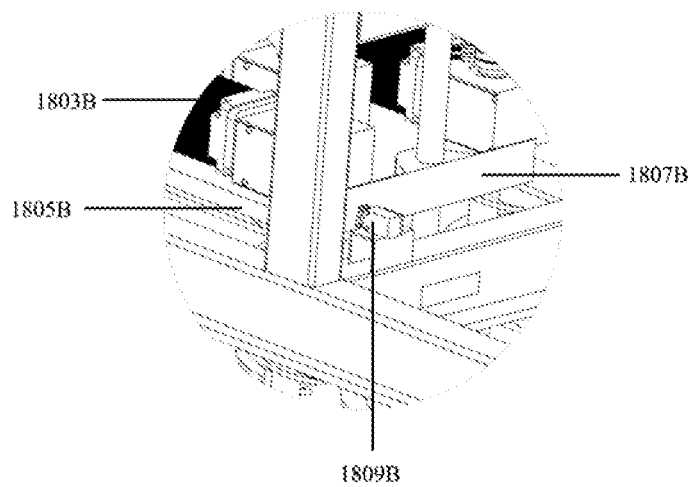
FIG. 18B illustrates an exemplary view of FIG. 18A, in accordance with at least one embodiment.

FIG. 18B illustrates an exemplary view of a close-up of FIG. 18A, in accordance with at least one embodiment. FIG. 18B depicts a close-up 1803b of FIGS. 10a and 1009a, a drilling array platform 1805B, a back wall of drilling array platform 18078, and a limit switch 1809B.

Figure 19A:
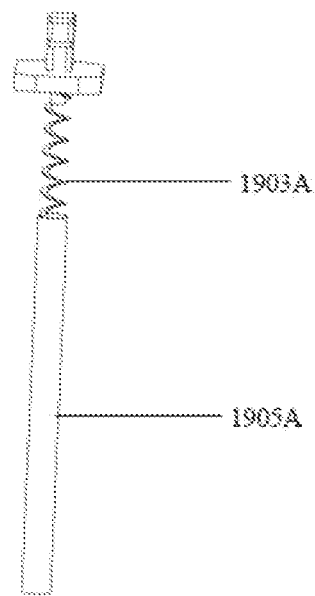
FIG. 19A illustrates an exemplary view of feeder auger flexible conveyor wire screw and conduit tube, in accordance with at least one embodiment.

FIG. 19A illustrates an exemplary view of feeder auger flexible conveyor wire screw and conduit tube, in accordance with at least one embodiment. FIG. 19A depicts a feeder auger flexible conveyor wire screw 1903A, a conduit tube 1905A, and a flight auger-feeder auger motor 1907A.

Figure 19B:
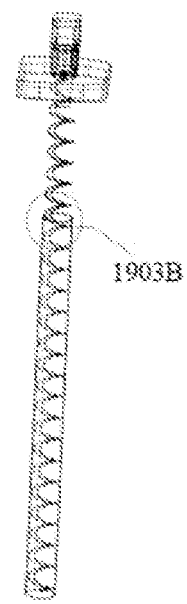
FIG. 19B illustrates an exemplary view of feeder auger flexible conveyor wire screw and transparent conduit tube, in accordance with at least one embodiment.

FIG. 19B illustrates an exemplary view of feeder auger flexible conveyor wire screw and transparent conduit tube, in accordance with at least one embodiment. FIG. 19B depicts a transparent conduit tube 1903B.

Figure 19C:
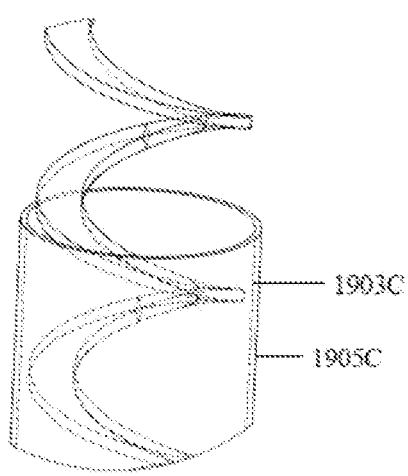
FIG. 19C illustrates a close-up view of an exemplary feeder auger flexible conveyor wire screw with transparent conduit tube and the inner wall of hollow shaft injection drill bit, in accordance with at least one embodiment.

FIG. 19C illustrates a close-up view of an exemplary feeder auger flexible conveyor wire screw with a transparent conduit tube and an inner wall of hollow shaft injection drill bit, in accordance with at least one embodiment. FIG. 19C depicts an outer dimension wall of a transparent conduit tube 1903C, and an inner dimension wall of a hollow shaft drill bit 1905C.

Figure 19D:
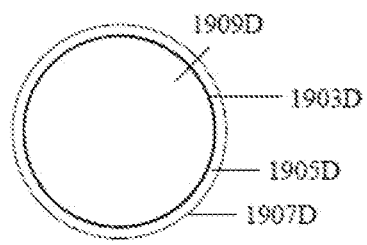
FIG. 19D illustrates a close-up view of an exemplary top view of feeder auger flexible conveyor wire screw and transparent conduit tube hollow chamber(s) for wires, in accordance with at least one embodiment.

FIG. 19D illustrates a close-up view of an exemplary top view of feeder auger flexible conveyor wire screw and transparent conduit tube hollow chamber(s) for wires, in accordance with at least one embodiment. FIG. 19D depicts an inner dimension wall of a transparent conduit tube 1903D, a cavity wire area between 1903D and 1907D wall of a transparent tube for constituents 1905D, and an outer dimension wall of a transparent tube 1907D for constituents, and a cavity 1909D for feeder auger.

Figure 19E:
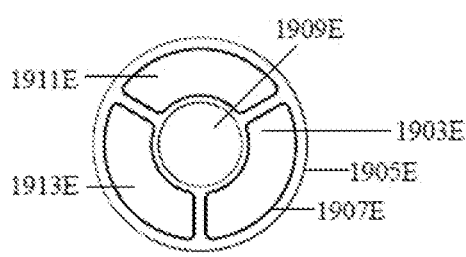
FIG. 19E illustrates a close-up view of an exemplary top view of feeder auger flexible conveyor wire screw and transparent conduit tube hollow chamber(s) for wires, in accordance with at least one embodiment.

FIG. 19E illustrates a close-up view of an exemplary top view of feeder auger flexible conveyor wire screw and transparent conduit tube hollow chamber(s) for wires, in accordance with at least one embodiment. FIG. 19E depicts a cavity wire area 1903E between 1903d and 1907d wall of a transparent tube for constituents, an outer dimension wall of a transparent tube 1905E for constituents, outer dimension wall 1907E of 1903E, a cavity 1909E for feeder auger, a cavity wire area 1911E between 1903D and 1907D wall of a transparent tube for constituents, and cavity wire area 1913E between 1903D and 1907D wall of a transparent tube for constituents.

Further, the present specification related to the aperture assembly for use with a subsurface ejection vessel that includes an electromagnet (FIG. 4B), a first dynamic aperture (309C), a second dynamic aperture (FIG. 2), an encoder (1605B), a lead screw (1713), a plurality of limit switches (1705, 1707, and 1709), an artificial intelligence (AI) robot (1407C), a computer (1411C), a programmable logic controller (PLC) (1405C), a camera lens (1503), a hollow shaft injection drill bit (1711), a third dynamic aperture (807C), a plurality of collar perforations (607B), and a plurality of closed window apertures (907A, 907B, and 907C). The electromagnet (FIG. 4B) actuates a closing of the first dynamic aperture (309C). The electromagnet (FIG. 4B) actuates an opening of the second dynamic aperture (FIG. 2). The third dynamic aperture (807C) dynamically opens when triggered by a first pre-determined depth achievement counting by the encoder (1605B) of the lead screw (1713) or distance traveled by a platform (505A) triggered by the limit switch (1707) that are communicated to the AI robot (1407C), the computer (1411C), and the PLC (1405C). The third dynamic aperture (807C) dynamically opens when the camera lens (1503) has a second pre-determined depth penetration of the hollow shaft injection drill bit (1711) and that the limit switch (1707) information is communicated to the computer (1411C), or the PLC (1405C). The collar perforations (607B) enable pushing a plurality of sub-surface constituents and soils away from one or more of a plurality of collar apertures, and a plurality of collar windows. In an embodiment, 605B is a fixed collar whose collar windows 607B (perforations) are a honeycomb structure (for strength) the collar apertures are the honeycomb windows which are on in the same 607B. In an embodiment, the cone-shaped spill (611B) whose apex enables less penetration from the soil, as this iteration of the invention does not have an actuated aperture, but the collar perforations and the apex of the cone-shaped spillway inhibit soil migration into the hollow shaft injection drill bit bottom aperture. The closed window apertures (907A. 907B, and 907C) perform closure during descent to prevent soil penetration into the hollow shaft injection drill bit (1711). The closed window apertures (907C) during descent to prevent soil penetration into the hollow shaft injection drill bit (1711).

In an embodiment, the aperture assembly includes an aperture (105B) to perform closure during descent to prevent soil penetration into the hollow shaft injection drill bit (1711).

In an embodiment, the aperture assembly includes an electromagnetic spring aperture (703B) to perform closure during descent because of an inverted matching of an apex of a cone-shaped spillway (709A) to the electromagnetic spring aperture (7038) to prevent soil penetration into the hollow shaft injection drill bit (1711).

In an embodiment, the electromagnetic spring aperture (703B) opens during ascent because of the inverted matching of the apex of the cone-shaped spillway (709A) to the electromagnetic spring aperture (703B) to prevent soil penetration into the hollow shaft injection drill bit (1711).

In an embodiment, the third dynamic aperture (807C) closes dynamically when the camera lens (1503) and a gimbal (1505) have a pre-determined depth descent penetration of the hollow shaft injection drill bit (1711), and that information is communicated to the PLC (1405C), the AI robot (1407C), the gimbal (1505), and the computer (1411C).

In an embodiment, the third dynamic aperture (807C) opens dynamically when a pre-set of the plurality of the limit switches (1705, 1707, and 1709) has been triggered by the platform (505A) traveling to a pre-determined depth penetration of the hollow shaft injection drill bit (1711) and that information is communicated to the PLC (1405C), the AI robot (1407C), the gimbal (1505), and the computer (1411C).

In an embodiment, the third dynamic aperture (807C) closes when the pre-set of the plurality of the limit switches (1705, 1707, and 1709) has been triggered by an injection drill bit array (1703) descent traveling to a determined depth penetration of the hollow shaft injection drill bit (1711) and that information is communicated to the PLC (1405C), the AI robot (1407C), the gimbal (1505), and the computer (1411C).

In an embodiment, the third dynamic aperture (807C) performs communication that enables multiple injection openings and closings by descending then ascending, and then re-descending with a subsequent ascent.

In an embodiment, the third dynamic aperture (807C) performs communication that enables multiple injection durations in concert with a load cell dispensing.

In an embodiment, the third dynamic aperture (807C) performs depth and volume communication that enables specific constituent injection duration in concert with the load cell dispensing.

In an embodiment, the third dynamic aperture (807C) and the encoder (1605B) perform timed revolutions communication with the PLC (1405C), the AI robot (1407C), the gimbal (1505), and the computer (1411C) and optionally, an induction sensor (IS)(not shown in figures) that enable multiple injection durations in concert with soil and or subsoil porosity enabled by slowed encoder revolutions of a lead screw (1713) progress.

In an embodiment, the third dynamic aperture (807C) performs communication that enables specific constituent injection durations in concert with specific X, Y location of a Global Positioning System (GPS) (1413C) of core sample soil and/or amendment needs to be obtained from a subsoil database.

In an embodiment, the collar perforations (607B) protect the apertures from soil penetration.

In an embodiment, the collar perforations (607B) strengthen an ejection assembly through shapes like honeycombs or uniform windows.

In an embodiment, the collar perforations (607B) in shapes or patterns enable structural integrity and whose burrs and or beveled edges push away soils from the aperture.

In an embodiment, the third dynamic aperture (807C) enables the opening and closing of the aperture to enable multiple sub-surface injections within the same strata and or horizon.

In an embodiment, the third dynamic aperture (807C) enables the constituent loading by sequence and volume for subsequent injection.

In an embodiment, the third dynamic aperture (807C) enables the ejection from a tube within and/or hollow shaft injection drill bit (1711) at specific depths and location of the GPS (1413C).

In an embodiment, the third dynamic aperture (807C) enables the ejection from a tube within and/or hollow shaft injection drill bit (1711) at specific time intervals.

In an embodiment, the third dynamic aperture (807C) enables multiple loads and reloads of the constituents to create larger volume horizons of constituents at specific depths.

In an embodiment, the third dynamic aperture (807C) enables actuation based on proximity to root systems that happen in concert with Lidar mapping or known root depth of specific plants or trees.

In an embodiment, the third dynamic aperture (807C) enables the injection of a single constituent or multiple constituents either separated by volume and strata for placement in multiple states either colloid, dry, damp, or mixed as a slurry or liquid.

In an embodiment, the third dynamic aperture (807C) enables the injection of a gas, vapor, and/or fogs by volume at specific depths for placement.

In an embodiment, the third dynamic aperture (807C) enables the ejection of a plurality of living organisms comprising earthworms and/or any eggs, larva from the hollow shaft injection drill bit (1711), or tube of the hollow shaft injection drill bit (1711) or ejected the tube into the sub-surface soil.

In an embodiment, the third dynamic aperture (807C) enables the constituents of living organisms injection, wherein the constituents of living organisms comprising aneic earthworms to improve porosity by penetrating subsoil below a root zone.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms enclosed. On the contrary, the intention is to cover all modifications, alternative constructions, and equivalents falling within the spirit and scope of the invention, as defined in the appended claims. Thus, it is intended that the present invention cover the modifications and variations of this invention, provided they are within the scope of the appended claims and their equivalents.

FIG. 1A
103A Electro Magnetic Spring Injection Drill Bit Aperture Cap
105A Injection Drilling Bit with Hollow Shaft and no perforations
107A Injection Drilling Bit with Hollow Shaft
FIG. 1B
103B Injection Drill Bit Screw
105B Close-up of FIG. 1A and #103A and Electro-Magnetic Spring Injection Drill Bit Cap
FIG. 2
203 Positive Wire
205 Negative Wire
207 Spring
209 Extension Spring
211 Spring Aperture Cap Panel Segment
FIG. 3A
303A Cross-section of area for Electromagnet wires, copper bands, insulation, carbon brushes, and spring
305A Positive and Negative Wires
307A Electromagnet Spring Cap
FIG. 3B
303B Positive Wire
305B Cross Section expanded view of the area for Electromagnet wires, copper bands, insulation, carbon brushes, and spring
307B Cross Section expanded view of the area for Electromagnet wires, copper bands, insulation, carbon brushes, and spring
309B Negative Wire
FIG. 3C
303C Cross Section close-up view of Negative and Positive Wires
305C Non-Perforated Wall of Injection Hollow Shaft Drill Bit
307C Rib of Drill Bit
309C Cross Section expanded view of FIG. 2
FIG. 4A
403A Electromagnet and wiring
405A Hollow Shaft Injection Drill Bit
407A Hollow Shaft Injection Drill Bit Screw Rib
409A Open Bottom of Hollow Shaft Injection Drill Bit
FIG. 4B
403B Wall of Hollow Shaft injection drill bit
405B Positive Wire
407B Insulation
409B Carbon Brush
411B Spring
413B Positive Wire
415B Negative Wire
417B Spring
419B Carbon Brush
421B Insulation
423B Protrusion Jacket
425B Negative Wire
427B Copper Bands
429B Copper Bands
FIG. 5A
503A Hollow Shaft Injection Drill Bit Assembly without perforations
505A Platform
FIG. 5B
503B Positive Wire
505B Negative Wire
507B Gear Box
FIG. 6A
603A Call Out for a close-up view of FIG. 6B
FIG. 6B
603B Hollow Injection Drill Bit Rib
605B Collar
607B Collar Perforations in the shape of hexagons honey comb whose edge is beveled to create tooth
609B Injection Drill Bit Extension
611B Cone-Shaped Spillway
FIG. 7A
703A Collar Window
705A Injection Drill Bit Auger Extension
707A Collar
709A Cone-Shaped Spillway
FIG. 7B
703B Electromagnetic Spring Aperture
705B Collar
707B Collar Window
FIG. 8A
803A Call Out of an Open Window Aperture Close View as Seen in FIG. 8C
FIG. 8B
803B Window Aperture In Open Position
805B Electromagnet Spring
807B Aperture Opening
809B Spillway Cone
FIG. 8C
803C Hollow Shaft of Injection Drill Bit Auger
805C Collar
807C Aperture Opening
809C Spillway Cone
FIG. 9A
903A Hollow Shaft of Injection Drilling Auger
905A Collar
907A Partially Closed Window Aperture
909A Cone-Shaped Spillway
911A Shaft of Injection Drilling Auger
913A Window
915A Window
917A Partially Closed Window Aperture
FIG. 9B

903B Hollow Shaft of Injection Drilling Auger
905B Collar
907B Three Quarters Closed Window Aperture
909B Cone-Shaped Spillway
911B Shaft of Injection Drilling Auger
FIG. 9C
903C Hollow Shaft of Injection Drilling Auger
905C Collar
907C Closed Window Aperture
909C Shaft of Injection Drilling Auger
FIG. 10A
1003A Electromagnet Coil, Negative and Positive Wires
1005A Window Vertical Aperture
FIG. 10B
1003B Coil
10051B Insulation
1007B Positive Wire
1009B Negative Wire
1011B Shaft of Injection Drilling Auger
FIG. 10C
1003C Electrical Wires
1005C Spring
1007C Insulation
1009C Window Vertical Aperture
1011C Cone Spillway
FIG. 11A
1103A Hollow Shaft of Injection Drill
1105A Coil
1107A Spring
1109A Cone-Shaped Spillway
FIG. 11B
1103B Coil
1105B Insulation
1107B Spring
1109B Cone-Shaped Spillway
FIG. 12
1203 Process Methodology Diagram
FIG. 13
1303 Process Methodology Diagram
FIG. 14A
1403A Satellite Communications Dish
1405A Communications Platform containing components seen in FIG. 14C
FIG. 14B
140B Satellite Communications Dish
FIG. 14C
1403C Fuel Cell
1405C PLC
1407C AI Robot
1409C Router
1411C Computer
1413C GPS
FIG. 15
1503 Camera Lens
1505 Gimbal
1507 Antenna
FIG. 16A
1603A Lead Screw
1605A Encoder
FIG. 16B
1603B Lead Screw
1605B Encoder
FIG. 17
1703 injection Drill Bit Array Platform
1705 Limit Switch
1707 Limit Switch
1709 Limit Switch
1711 Hollow Shaft Injection Drill Bit
1713 Lead Screw
FIG. 18A
1803A Back Wall of Drilling Array Platform
1805A Limit Switch
1807A Drilling Array Platform
1809A Call Out for Close Up of FIG. 10B
FIG. 18B
1803B Close Up of FIG. 10A and #1009A
1805B Drilling Array Platform
1807B Back Wall of Drilling Array Platform
1809B Limit Switch
FIG. 19A
1903A Feeder Auger Flexible Conveyor Wire Screw
1905A Conduit Tube
1907A Flight Auger-Feeder Auger Motor
FIG. 19B
1903B Transparent Conduit Tube
FIG. 19C
1903C Outer Dimension Wall of a Transparent Conduit Tube
1905C Inner Dimension Wall of a Hollow Shaft Drill Bit
FIG. 19D
1903D Inner Dimension Wall of a Transparent Conduit Tube
1905D Cavity Wire Area between, #1903D and #1907D Wall of a Transparent Tube for Constituents
1907D Outer Dimension Wall of a Transparent Tube for Constituents
1909D Cavity for Feeder Auger
FIG. 19E
1903E Cavity Wire Area between #1903D and #1907D Wall of a Transparent Tube for Constituents
1905E Outer Dimension Wall of a Transparent Tube for Constituents
1907E Outer Dimension Wall of #1903E
1909E Cavity for Feeder Auger
1911E Cavity Wire Area between #1903D and #1907D Wall of a Transparent Tube for Constituents
1913E Cavity Wire Area between #1903D and #1907D Wall of a Transparent Tube for Constituents

The invention claimed is:

1. An aperture assembly for use with a subsurface ejection vessel, comprising:
   an electromagnet;
   a first dynamic aperture, wherein the electromagnet actuates a closing of the first dynamic aperture;
   a second dynamic aperture, wherein the electromagnet actuates an opening of the second dynamic aperture;
   an encoder;
   a lead screw;
   a plurality of limit switches;
   an artificial intelligence (AI) robot;
   a computer;
   a programmable logic controller (PLC);
   a camera lens;
   a hollow shaft injection drill bit;
   a third dynamic aperture dynamically opens when triggered by a first pre-determined depth achievement counting by the encoder of the lead screw or distance traveled by a platform triggered by the limit switch that are communicated to the AI robot, the computer, and the PLC, wherein the third dynamic aperture dynamically opens when the camera lens has a second pre-determined depth penetration of the hollow shaft injection drill bit and that the limit switch information is communicated to the computer, or the PLC;

a plurality of collar perforations to enable pushing a plurality of sub-surface constituents and soils away from one or more of a plurality of collar apertures, and a plurality of collar windows; and a plurality of closed window apertures perform closure during descent to prevent soil penetration into the hollow shaft injection drill bit, wherein the closed window apertures during descent to prevent soil penetration into the hollow shaft injection drill bit.

2. The aperture assembly as claimed in claim 1, comprises an aperture to perform closure during descent to prevent soil penetration into the hollow shaft injection drill bit.

3. The aperture assembly as claimed in claim 1, comprises an electromagnetic spring aperture to perform closure during descent because of an inverted matching of an apex of a cone-shaped spillway to the electromagnetic spring aperture to prevent soil penetration into the hollow shaft injection drill bit.

4. The aperture assembly as claimed in claim 3, wherein the electromagnetic spring aperture opens during ascent because of the inverted matching of the apex of the cone-shaped spillway to the electromagnetic spring aperture to prevent soil penetration into the hollow shaft injection drill bit.

5. The aperture assembly as claimed in claim 1, wherein the third dynamic aperture closes dynamically when the camera lens and a gimbal have a pre-determined depth descent penetration of the hollow shaft injection drill bit and that information is communicated to the PLC, the AI robot, the gimbal, and the computer.

6. The aperture assembly as claimed in claim 1, wherein the third dynamic aperture opens dynamically when a pre-set of the plurality of the limit switches has been triggered by the platform traveling to a pre-determined depth penetration of the hollow shaft injection drill bit and that information is communicated to the PLC, the AI robot, the gimbal, and the computer.

7. The aperture assembly as claimed in claim 1, wherein the third dynamic aperture closes when the pre-set of the plurality of the limit switches has been triggered by an injection drill bit array descent traveling to a determined depth penetration of the hollow shaft injection drill bit and that information is communicated to the PLC, the AI robot, the gimbal, and the computer.

8. The aperture assembly as claimed in claim 1, wherein the third dynamic aperture performs communication that enables multiple injection openings and closings by descending then ascending, and then re-descending with a subsequent ascent.

9. The aperture assembly as claimed in claim 1, wherein the third dynamic aperture performs communication that enables multiple injection durations in concert with a load cell dispensing.

10. The aperture assembly as claimed in claim 1, wherein the third dynamic aperture perform depth and volume communication that enables specific constituent injection duration in concert with a load cell dispensing.

11. The aperture assembly as claimed in claim 1, wherein the third dynamic aperture and the encoder perform timed revolutions communication with the PLC, the AI robot, the gimbal, and the computer that enable multiple injection durations in concert with soil and or subsoil porosity enabled by slowed encoder revolutions of a lead screw progress.

12. The aperture assembly as claimed in claim 1, wherein the third dynamic aperture performs communication that enables specific constituent injection durations in concert with specific X, Y location of a Global Positioning System (GPS) of core sample soil and/or amendment needs to be obtained from a subsoil database.

13. The aperture assembly as claimed in claim 1, wherein the collar perforations protect the apertures from soil penetration.

14. The aperture assembly as claimed in claim 1, wherein the collar perforations strengthen an ejection assembly through shapes being honeycombs or uniform windows.

15. The aperture assembly as claimed in claim 1, wherein the collar perforations in shapes or patterns enable structural integrity and whose burrs and or beveled edges push away soils from the aperture.

16. The aperture assembly as claimed in claim 1, wherein the third dynamic aperture enables opening and closing of the aperture to enable multiple sub-surface injections within the same strata and or horizon.

17. The aperture assembly as claimed in claim 1, wherein the third dynamic aperture enables the constituent loading by sequence and volume for subsequent injection.

18. The aperture assembly as claimed in claim 1, wherein the third dynamic aperture enables the ejection from a tube within and/or hollow shaft injection drill bit at specific depths and location of the GPS.

19. The aperture assembly as claimed in claim 1, wherein the third dynamic aperture enables the ejection from a tube within and/or hollow shaft injection drill bit at specific time intervals.

20. The aperture assembly as claimed in claim 1, wherein the third dynamic aperture enables multiple loads and reloads of the constituents to create larger volume horizons of constituents at specific depths.

21. The aperture assembly as claimed in claim 1, wherein the third dynamic aperture enables actuation based on proximity to root systems that happen in concert with Lidar mapping or known root depth of specific plants or trees.

22. The aperture assembly as claimed in claim 1, wherein the third dynamic aperture enables the injection of a single constituent or multiple constituents either separated by volume and strata for placement in multiple states either colloid, dry, damp, or mixed as a slurry or liquid.

23. The aperture assembly as claimed in claim 1, wherein the third dynamic aperture enables the injection of a gas, vapor, and/or fogs by volume at specific depths for placement.

24. The aperture assembly as claimed in claim 1, wherein the third dynamic aperture enables the ejection of a plurality of living organisms comprising earthworms and/or any eggs, larva from the hollow shaft injection drill bit, or tube of the hollow shaft injection drill bit or ejected the tube into the sub-surface soil.

25. The aperture assembly as claimed in claim 1, wherein the third dynamic aperture enables the constituents of living organisms injection, wherein the constituents of living organisms comprising aneic earthworms to improve porosity by penetrating subsoil below a root zone.

* * * * *